US006468155B1

(12) United States Patent
Zucker et al.

(10) Patent No.: US 6,468,155 B1
(45) Date of Patent: Oct. 22, 2002

(54) SYSTEMS AND METHODS TO FACILITATE GAMES OF SKILL FOR PRIZES PLAYED VIA A COMMUNICATION NETWORK

(75) Inventors: David F. Zucker, New York, NY (US); Norman L. Merritt, Jr., Riverside, CT (US); Leigh Zarelli; R. Montrose Graham, both of New York, NY (US); Mark L. Kirschner, Maplewood, NJ (US); Sarah F. Davies, Wilmington, DE (US); V. Maximillian Garcia, New Haven, CT (US); Eric Berlin, Maplewood; William B. Feehan, Princeton Junction, both of NJ (US); Richard Mass, New York, NY (US); Derek J. Murphy, South Orange, NJ (US)

(73) Assignee: Skillgames, Inc., New York, NY (US)

( * ) Notice: Subject to any disclaimer, the term of this patent is extended or adjusted under 35 U.S.C. 154(b) by 0 days.

(21) Appl. No.: 09/851,270

(22) Filed: May 8, 2001

(51) Int. Cl.[7] .................................................. A63F 13/00

(52) U.S. Cl. ............................. 463/23; 463/29; 463/42

(58) Field of Search ............................. 463/23, 29, 40, 463/41, 42

(56) References Cited

U.S. PATENT DOCUMENTS

| | | | | | |
|---|---|---|---|---|---|
| 3,964,179 | A | * | 6/1976 | Bennett | 35/31 |
| 4,314,336 | A | * | 2/1982 | Bernstein et al. | 364/411 |
| 4,339,798 | A | * | 7/1982 | Hedges et al. | 364/412 |
| 4,380,334 | A | * | 4/1983 | Minkoff et al. | 273/1 |
| 4,592,546 | A | * | 6/1986 | Fascenda et al. | 273/1 |
| 4,815,741 | A | * | 3/1989 | Small | 273/138 |
| 5,377,100 | A | * | 12/1994 | Pope et al. | 364/410 |
| 5,413,357 | A | * | 5/1995 | Schulze et al. | 273/436 |
| 5,586,257 | A | * | 12/1996 | Perlman | 463/42 |
| 5,711,715 | A | * | 1/1998 | Ringo et al. | 473/9 |
| 5,779,546 | A | * | 7/1998 | Meissner et al. | 463/25 |
| 5,813,913 | A | * | 9/1998 | Berner et al. | 463/40 |
| 5,882,258 | A | * | 3/1999 | Kelly et al. | 463/11 |
| 5,882,262 | A | * | 3/1999 | Ballhorn | 463/43 |
| 6,213,873 | B1 | * | 4/2001 | Gasper et al. | 463/14 |
| 6,224,486 | B1 | * | 5/2001 | Walker et al. | 463/42 |
| 6,336,861 | B1 | * | 1/2002 | Konoe et al. | 463/23 |
| 6,352,479 | B1 | * | 3/2002 | Sparks, II | 463/42 |
| 2002/0042293 | A1 | * | 4/2002 | Ubale et al. | 463/9 |

* cited by examiner

*Primary Examiner*—Lesley D. Morris
*Assistant Examiner*—Frederick C Nicolas
(74) *Attorney, Agent, or Firm*—Patrick J. Buckley

(57) ABSTRACT

Systems and methods are provided to facilitate games of skill for prizes played via a communication network. According to one embodiment, a potential game to be played at a remote player device via a communication network is determined. The potential game is evaluated to estimate an amount of player skill required to play the potential game, the evaluation being performed based on a sample of player performance information. The potential game is also evaluated to determine an ability of an automated game playing device to play the potential game. The potential game is modified if (i) the amount of player skill required is unacceptable or (ii) the ability of the automated game playing device is unacceptable.

17 Claims, 19 Drawing Sheets

1200

| PLAYER IDENTIFIER 1202 | NAME 1204 | CONTACT INFORMATION 1206 | PAYMENT IDENTIFIER 1208 | ACCOUNT BALANCE 1210 |
|---|---|---|---|---|
| P1001 | JENNIFER JAMES | 32 GARDEN RD. NEWTOWN, USA | 1234-1234-1234-1234 (CREDIT CARD) | +$20.00 |
| P1002 | MICHAEL SMITH | MSMITH@ISP.COM | 1111-2222-3333-4444 (DEBIT CARD) | - $10.00 |
| P1003 | DAVID STONE | (718) 555-1111 | ABC@PAY.COM | 0 |
| P1004 | SUSAN WHITE | (212) 555 1234 | 1212-1212-1212-1212 (CREDIT CARD) | - $0.10 |
| P1005 | KEVIN DOWNS | 1234.5678.1234.5678 | 123456789 (BANK ACCOUNT) | + 1,000 |

FIG. 12

1300

| GAME PLAY IDENTIFIER 1302 | PLAYER IDENTIFIER 1304 | GAME RESULT 1306 |
|---|---|---|
| G00-001 | P1001 | $0.00 |
| G00-002 | P1001 | $250.00 |
| G00-003 | P1005 | FREE PLAY |
| G00-004 | P1002 | FREE PLAY |
| G00-005 | P1001 | $10.00 |

FIG. 13

1400

| GAME IDENTIFIER 1402 | TOTAL GAME RESULT 1404 | APPROPRIATE LEARNING CURVE 1406 | APPROPRIATE PRIZE MODEL 1408 |
|---|---|---|---|
| G00 | $12,500 | YES | YES |
| G01 | -$2,000 | YES | NO |
| G02 | $1,000 | NO | UNKNOWN |
| G03 | $45,000 | YES | YES |

FIG. 14

SYSTEMS AND METHODS TO FACILITATE GAMES OF SKILL FOR PRIZES PLAYED VIA A COMMUNICATION NETWORK

FIELD

The present invention relates to games. In particular, the present invention relates to systems and methods to facilitate games of skill for prizes played via a communication network.

BACKGROUND

Many people enjoy playing games. For example, many people enjoy playing games of chance, trivia games, puzzle games, and arcade-style games (e.g., games in which a player collects points as he or she maneuvers a character across a landscape or through a maze). One reason a player may enjoy playing a game is that he or she finds it entertaining to play the game according to a set of rules associated with the game. For example, a player may enjoy trying to solve a picture puzzle according to a particular set of rules. Another reason may be that he or she enjoys achieving a successful game result (e.g., by completing a crossword puzzle). The way a game is presented, the complexity of game rules, and the likelihood of achieving a successful game result can all contribute to whether or not players will find the game entertaining and enjoyable.

Many players especially enjoy playing "online" games, such as games played by communicating with a game provider via a communication network. For example, a player may use his or her Personal Computer (PC) to communicate with an online game provider through the Internet. With online games, a player can decide when and where a game will be played. For example, the player may decide to play a game while at his or her home or office, or even while traveling. This flexibility is one reason why so many players enjoy playing online games.

To increase interest in a game, an online game provider can arrange for some players to receive prizes. For example, a game provider may arrange a tournament in which multiple players compete against each other. In this case, players may be required to provide entry fees in exchange for participating in the tournament, and some or all of the entry fees can then be awarded to a player based on his or her relative performance as compared to other players (e.g., fifty percent of the entry fees can be awarded to the best player in a tournament).

Some online game providers also arrange for players to receive prizes in non-tournament games, such as online casinos that arrange for players to receive prizes in games of chance. For example, players may be allowed to place bets with an online casino, and prizes may be awarded to players based on game results that are randomly determined by the online casino. Popular games of chance include slot machine games, roulette games, and card games (e.g., blackjack games and poker games).

However, games of chance for prizes are often regulated, or even prohibited, by governmental authorities. For example, a particular country, or region within a country, may completely prohibit a game provider from collecting payments from players and awarding prizes to players based on game results that are generated in a predominantly random manner (i.e., by prohibiting "gambling").

To avoid such problems, a game provider may instead arrange for players to play games of "skill" in which a game result is determined predominantly a player's performance. For example, many people enjoy playing computer-based simulated golf games. In this case, a player provides one or more input parameters (e.g., a speed and angle associated with a swing of a simulated golf club), and a trajectory is calculated for a simulated golf ball based on the input parameters. A game result is then determined, and a successful game result may indicate, for example, that the simulated golf ball has come to rest within a predetermined distance of a simulated golf hole.

It is known that a game provider can award prizes to players to who play games of skill. For example, a game provider may award a five dollar gift certificate to any player who shoots a hole-in-one during a computer-based simulated golf game. Prizes can similarly be awarded in other types of games of skill, including trivia games, word-puzzle games, and arcade-style games. For example, a game provider may award a prize to any player who scores at least 5,000 points in a trivia game. Typically, however, players do not provide payments in exchange for playing games of skill. Thus, the prizes that are awarded are generally for lower amounts (e.g., under ten dollars) and/or are less frequent (e.g., to one player out of ten thousand) as compared to games of chance.

A number of other problems may arise when a game provider arranges for players to play a game of skill. For example, players may become frustrated if a level of skill required to succeed in a game is too high. In this case, a player may feel that the game provider is being unfair because he or she cannot realistically achieve a successful game result. As a result, players may stop playing the game—especially if they are required to provide payment in exchange for playing the game.

Another problem that can arise when a game provider arranges for players to play a game of skill is that some players may dominate game play. Consider, for example, a player who is, or becomes, an "expert" at a game of skill. Such an expert player may frequently be able to receive a prize by achieving a particular game result. If he or she continually plays the game, the game provider may eventually award a large number of prizes (and provide payment of a significant total prize amount) to the expert player. In fact, the game provider may find itself awarding a larger amount than it receives from players (e.g., especially if the prize amounts are large or if there are a large number of expert players). To avoid losing money, the game provider may attempt to increase the payments that players provide in exchange for game play. However, the non-expert players, who in effect would now be subsidizing the expert players, may stop playing the game. Instead of increasing payments received from players, the game provider may attempt to the reduce prize amounts that are provided to players. This, however, may make the game less enjoyable and cause non-expert players to stop playing the game.

In addition to the expert player problem, a game provider may find that some players use automated game playing devices to unfairly achieve game results. That is, a player may alter a game program or develop a supplemental program to provide an unfair advantage during game play. For example, an automated game playing device may unfairly determine and display supplemental information to a player, such as a path through a maze that has been calculated by the automated game playing device. Players who use these types of automated game playing devices will cause many of the problems discussed above with respect to expert players (e.g., the game provider may lose money and/or players who do not use automated game playing devices may stop playing the game).

The problems associated with expert players and/or players who use automated game playing devices may be particularly prevalent when a game provider awards prizes to players based on game results. That is, the prizes may encourage expert players more than non-expert players (who are less likely to win the prizes) as well as motivate some players to create and/or use automated game playing devices. Similarly, these problems may be more common with respect to online games. For example, automated game playing devices may be more easily created and/or used in an online environment.

SUMMARY

To alleviate problems inherent in the prior art, the present invention introduces systems and methods to facilitate games of skill for prizes played via a communication network.

According to one embodiment, a fee is received from a player in exchange for game play. During game play, a player input parameter is received from a remote player device via a communication network. A game result is then determined based on the player input parameter and a value, the value being generated at a game controller without being communicated to the remote player device prior to the determination of the game result. A prize may then be awarded to the player based on the game result.

According to another embodiment, a fee is received from a player in exchange for game play. During game play, a player input parameter is received from a remote player device via a communication network. A game result is then determined based on the player input parameter and the game of skill, wherein the game of skill inhibits performance of an automated game playing device. A prize may then be awarded to the player based on the game result.

According to another embodiment, a potential game to be played by a player via a remote player device is determined. The potential game is then evaluated to estimate an amount of player skill required to play the potential game. The potential game is also evaluated to determine an ability of an automated game playing device to play the potential game. The potential game is then modified if (i) the amount of player skill required is unacceptable or (ii) the ability of the automated game playing device is unacceptable.

Still another embodiment, is directed to a game of skill associated with a first game goal that requires a substantial degree of player skill and is substantially susceptible to an automated game playing device. The game of skill is also associated with a second game goal that does not require a substantial degree of player skill and is not substantially susceptible to an automated game playing device.

One embodiment of the present invention comprises: means for receiving from a player a fee to play a game of skill; means for receiving a player input parameter from a remote player device via a communication network; means for determining a game result based on the player input parameter and a value, the value being generated at the game controller without being communicated to the remote player device prior to the determination of the game result; and means for providing a prize to the player based on the game result.

Another embodiment comprises: means for receiving from a player a fee to play a game of skill; means for receiving a player input parameter from a remote player device via a communication network; means for determining a game result based on the player input parameter and the game of skill, wherein the game of skill inhibits performance of an automated game playing device; and means for providing a prize to the player based on the game result.

Another embodiment comprises: means for determining a potential game to be played by a player via a remote player device; means for evaluating the potential game to estimate an amount of player skill required to play the potential game; means for evaluating the potential game to determine an ability of an automated game playing device to play the potential game; and means for modifying the potential game if (i) the amount of player skill required is unacceptable or (ii) the ability of the automated game playing device is unacceptable.

Still another embodiment comprises: means for receiving from a player a fee to play a game of skill, wherein the game of skill is associated with (i) a first game goal that requires a substantial degree of player skill and is substantially susceptible to an automated game playing device, and (ii) a second game goal that does not require a substantial degree of player skill and is not substantially susceptible to an automated game playing device; means for receiving a player input parameter from a remote player device via a communication network; means for determining a game result based on the player input parameter, the first game goal, and the second game goal; and means for providing a prize to the player based on the game result.

With these and other advantages and features of the invention that will become hereinafter apparent, the invention may be more clearly understood by reference to the following detailed description of the invention, the appended claims, and the drawings attached herein.

BRIEF DESCRIPTION OF THE DRAWINGS

FIG. 12 is a tabular representation of a portion of a player database according to an embodiment of the present invention.

FIG. 13 is a tabular representation of a portion of a game play database according to an embodiment of the present invention.

FIG. 14 is a tabular representation of a portion of a game database according to an embodiment of the present invention.

DETAILED DESCRIPTION

Embodiments of the present invention are directed to systems and methods to facilitate games of "skill" for prizes that are played via a communication network. As used herein, the phrase "game of skill" refers to any game in which a game result is determined based predominantly on a player's skill (e.g., as demonstrated by his or her performance) as opposed to chance. Note that the game result may also be based in part on chance (e.g., a randomly generated value). Moreover, as used herein, a "prize" may be any benefit that can be awarded to a player. By way of example, a prize may be a payment of a monetary amount or an alternate currency (e.g., a gift certificate).

Game System Overview

Figure 1A:
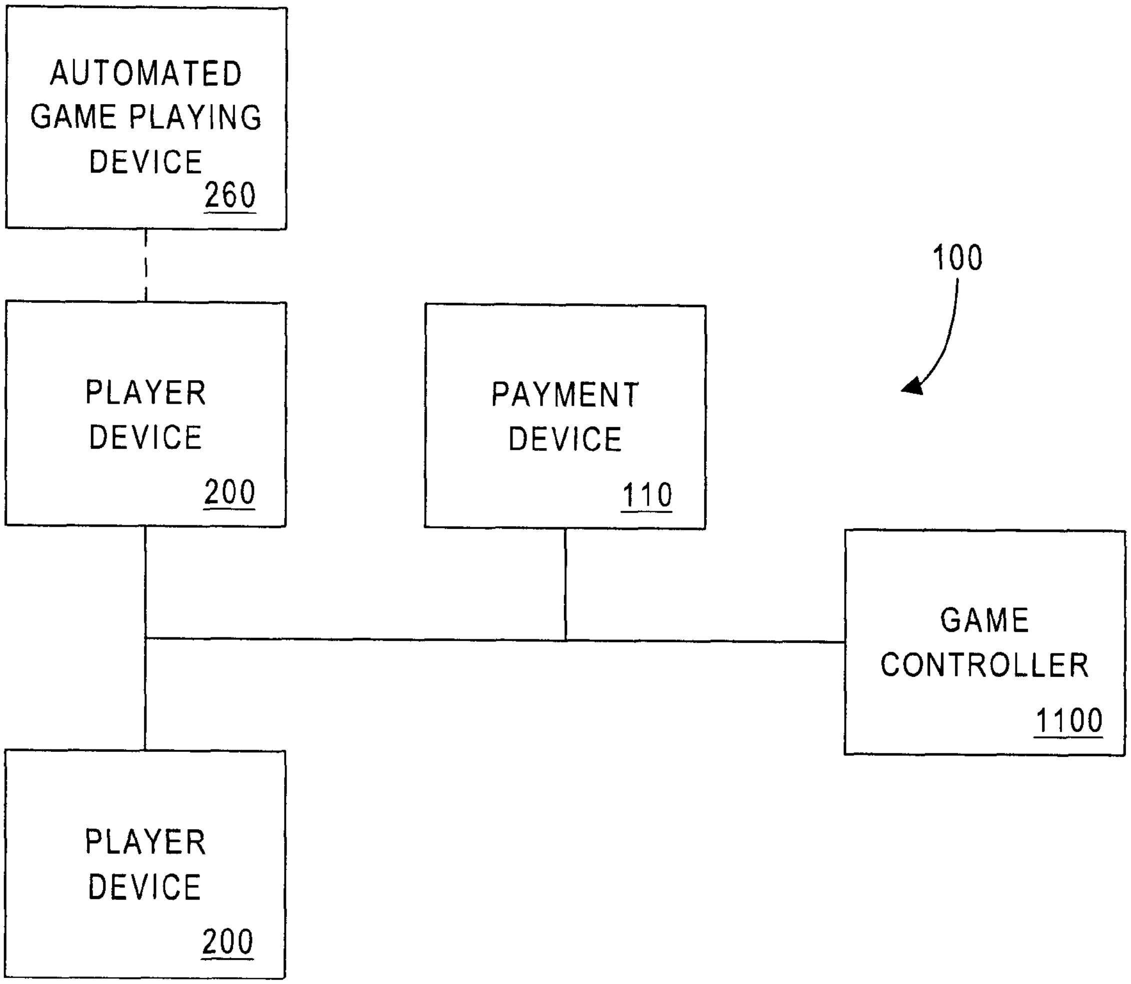
FIG. 1A is a block diagram overview of a game system according to an embodiment of the present invention.

Turning now in detail to the drawings, FIG. 1A is a block diagram of a game system 100 according to one embodiment of the present invention. The game system 100 includes a game controller 1100 in communication with a number of player devices 200. Note that although a single game controller 1100 is shown in FIG. 1A, any number of game controllers 1100 may be included in the game system 100. Similarly, any number of the other devices described herein may be included in the game system 100 according to embodiments of the present invention.

In one embodiment of the present invention, a player device 200 communicates with a remote, Web-based game controller 1100 (e.g., a server) via the Internet. Although some embodiments of the present invention are described with respect to information exchanged using a Web site, according to other embodiments information can instead be exchanged, for example, via: a telephone, an Interactive Voice Response Unit (IVRU), electronic mail, a WEBTV® interface, a cable network interface, and/or a wireless communication system.

The player device 200 and the game controller 1100 may be any devices capable of performing the various functions described herein. The player device 200 may be, for example: a PC, a portable computing device such as a Personal Digital Assistant (PDA), a wired or wireless telephone, a one-way or two-way pager, a kiosk (e.g., a game kiosk located at an airport terminal), an interactive television device, a game terminal (e.g., a SONY PLAY STATION® video game terminal), or any other appropriate storage and/or communication device.

Note that the devices shown in FIG. 1A need not be in constant communication. For example, a player device 200 may only communicate with the game controller 1100 via the Internet when appropriate (e.g., when attached to a "docking" station or "cradle" coupled to a player's PC). Note also that a player device 200 and the game controller 1100 may be incorporated in a single device (e.g., a game kiosk may act as both a player device 200 and the game controller 1100).

According to an embodiment of the present invention, a player uses a player device 200 to communicate with the game controller 1100. For example, a player may use his or her PC to access a Web site associated with the game controller 1100. The player may then play a game of skill (e.g., a computer-based golf game associated with a physics simulation), such as by using a keyboard or mouse coupled to the PC to provide input parameters to the game controller 1100.

As shown in FIG. 1A, a player may also attempt to use an automated game playing device 260 to help him or her during game play. The automated game playing device 260 may be, for example, a modified game program or a separate software program that is being executed on the player device 200. For example, a player may create an automated game playing device 260 that analyzes information received by, or stored at, the player device 200 in order to evaluate a simulated putting green terrain. The automated game playing device 260 may then calculate an optimal simulated swing for a player.

According to one embodiment, the game controller 1100 also arranges for the player to provide a payment in exchange for game play and/or arranges for the player to receive a payment of one or more prize amounts. For example, the game controller 1100 may arrange for $1,000 to be paid to a player who correctly answers twenty trivia questions. A payment device 110 may be used to arrange for the player to provide and/or receive payments. For example, the game controller 1100 may arrange for a player to purchase one or more game plays via the payment device 110 (e.g., via a credit card account, a debit card account, a banking account, or an electronic payment protocol). The payment device 110 may comprise, for example, a third party device (e.g., a credit card processing device), a check printer, and/or or an Automated Clearing House (ACH) device (e.g., when arranging to provide a "direct deposit" payment via a player's bank account).

Detailed Game System

Figure 1B:
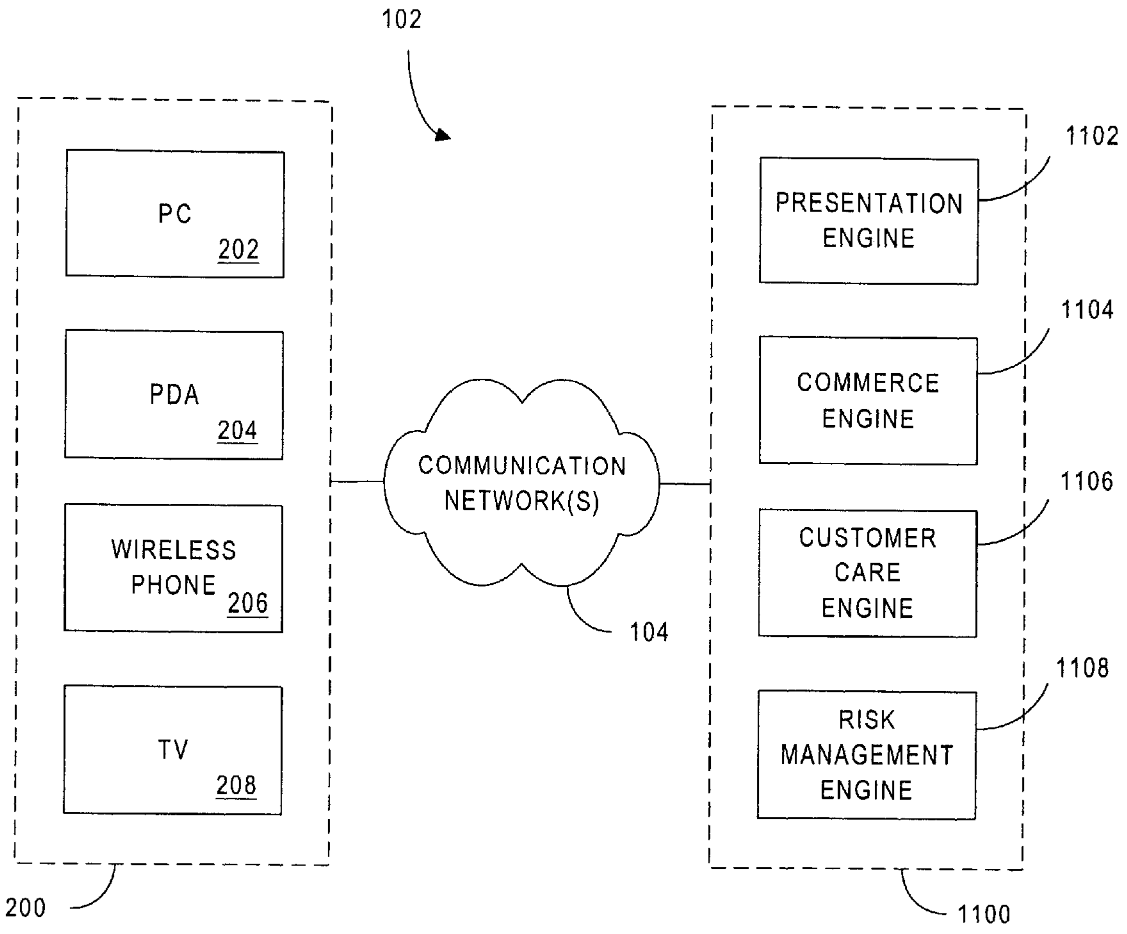
FIG. 1B is a block diagram overview of a game system according to another embodiment of the present invention.

FIG. 1B is a block diagram of a game system 102 wherein elements of a game controller 1100 communicate with different types of player devices 200 via one or more communication networks 104. In particular, the player devices 200 comprise a PC 202, a PDA 204, a wireless telephone 206, and a television 208.

The game controller 1100 may communicate with these devices, for example, via the Internet. According to other embodiments, the communication networks 104 comprise one or more of a Local Area Network (LAN), a Metropolitan Area Network (MAN), a Wide Area Network (WAN), a proprietary network, a Public Switched Telephone Network (PSTN), a Wireless Application Protocol (WAP) network, a cable television network, and other types of Internet Protocol (IP) networks such as an intranet or an extranet. Moreover, as used herein, communications include those enabled by wired or wireless technology. Note that the increasing ubiquity of Internet access, and the rapid growth of game playing online, may make the Internet a particularly fertile medium to develop a "cash for cash prizes" player experience.

According to one embodiment, the game controller 1100 is a highly scaleable, robust, and secure game site capable of sustaining very large transaction volumes in support of online "pay for play" games of skill. By way of example, the game controller 1100 may comprise one or more UNIX® servers using ORACLE° as the database environment. Some or all of the server side code may be written, for example, using the java programming language. If desired, multiple identical sites may created to allow for independent quality assessment, production, and development environments (e.g., to facilitate true load testing without impacting player experience).

The game controller 1100 may utilize a service-based architecture where like-minded functions are grouped together in modular code "services." Such services may be connected with public APIs (Application Programming Interfaces) that facilitate efficient growth of the software and scalability. Enhancements, maintenance, and performance tuning may all be supported through the service-based architecture as the game system 102 grows.

The game controller 1100 may incorporate various elements to make sure that the game system 102 is safe and secure for both the game provider and players. For example, network and systems security may be provided via: a dual fire-wall to create layered security; intrusion detection software; and strict access control on all servers. Application security may be provided via: Secure Sockets Layer (SSL) encryption of user demographic and financial data; strong authentication and authorization; and fortification of a standard application server (such as the WEBLOGIC application server). Data Security may be provided via: the encryption of game solution data in a database (e.g., to be exposed only at runtime); proprietary customer data encryption; and multi-character alpha-numeric passwords (e.g., an eight-character password). Operational Security may be provided via: offline editing of game solution content (e.g., such that the content is not accessible from the Internet); extremely limited access to content data; software deployments restricted to quality assessment functions separate from programmers; tight physical security procedures (including the location of Web servers); and a nuclear-hardened, highly secure facility.

As shown in FIG. 1B, the game controller 1100 includes a presentation engine 1102 (e.g., associated with the building of Web pages associated with game play) and a commerce engine 1104 (e.g., supporting cash transaction processing functionality) partitioned into separate domain models.

The game controller 1100 also includes a customer care engine 1106. The customer care engine 1106 may, for example, convey a theme to customers (i.e., players) that a game provider can be trusted. In particular, the game provider may institute strict accountability, process control, and audit practices to ensure that a customer's confidence is maintained (e.g., with respect to fulfillment of cash prizes, tax procedures, and credit card transactions). The customer care engine 1106 may also implement a service and operations capability focused on service quality. According to one embodiment, the customer care engine 1106 comprises a flexible process and service capability where dramatic swings in volume can be handled efficiently without compromising the quality of the game provider's commitment to the player.

For example, across every player interface (e.g., the Web site, marketing and service communications, and business practices) the game provider may convey a theme of trust and advocacy (e.g., by clearly and comprehensively explaining all aspects of game eligibility and rules, providing tips and hints on how to win a game, and implementing a monthly charge limit against a customer's credit card).

According to one embodiment, the customer care engine 1106 is associated with an "always on" (i.e., twenty-four hours a day) universal agent solution. In this case, customer care agents may be trained and empowered for single-contact resolution in the Internet environment. Based on demographic information, the game provider may also establish a case routing and management environment to leverage customer contacts for information gathering and marketing cross-sell opportunities.

The game controller 1100 also includes a risk management engine 1108. The risk management engine 1108 may, for example, use consumer demographic data to prevent children from accessing the site. A series of commerce and game risk management analytics and processes may also be used to reduce the game provider's exposure to monetary and game-play fraud. Leveraging risk management principles from the financial services industry, such preventive measures can also significantly reduce opportunities for credit card fraud. Additionally, operations research and statistical techniques may be deployed to on a near "real-time" basis identify and prevent game hacking (e.g., the use of automated game playing devices 260).

Examples of some player devices 200 that may be used in connection with the game systems 100, 102 will now be described in detail with respect to FIGS. 2 through 5.

Player Device

Figure 2:
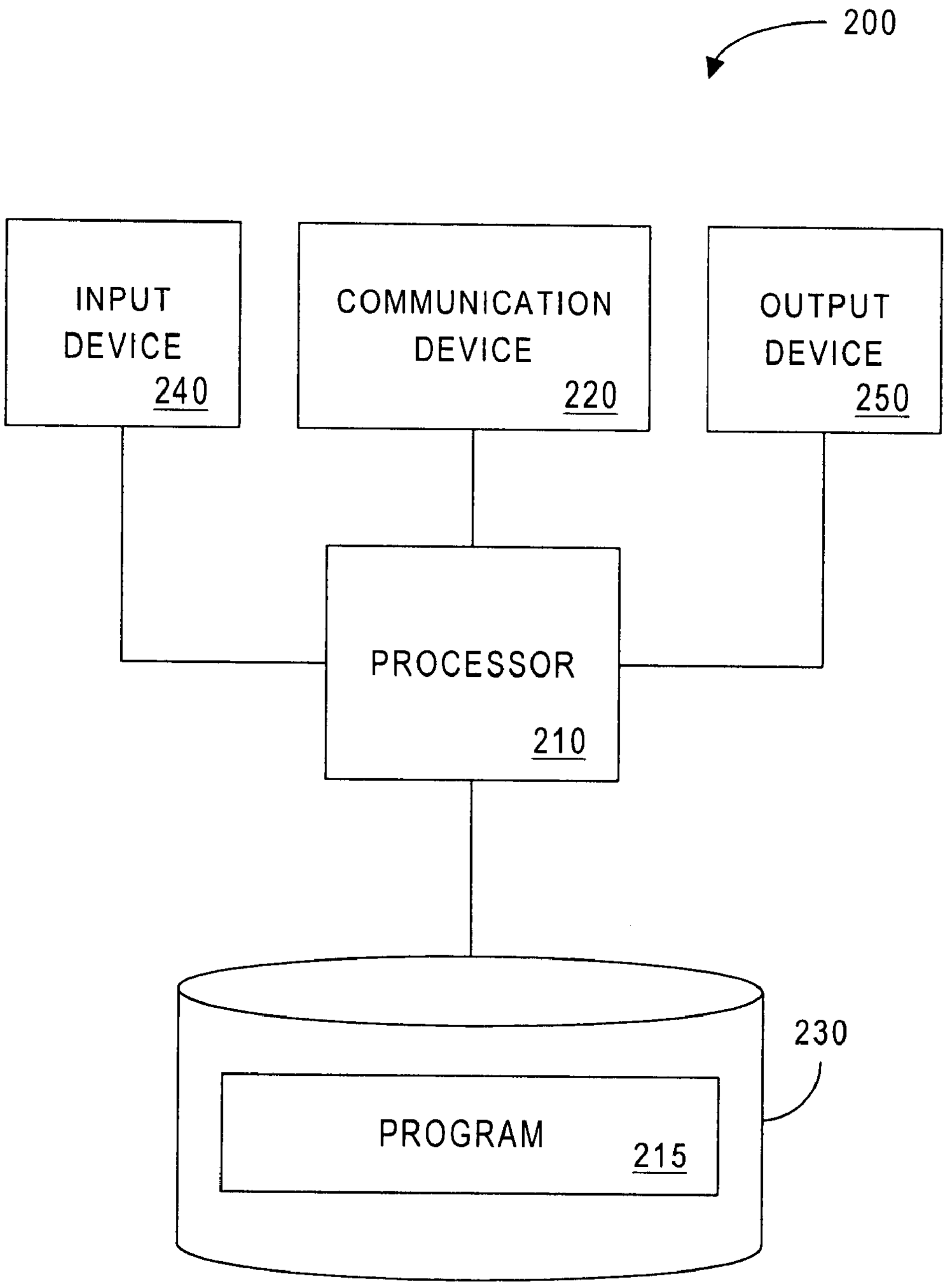
FIG. 2 is a block diagram of a player device according to an embodiment of the present invention.

FIG. 2 illustrates a player device 200 that is descriptive of the devices shown in FIGS. 1A and 1B according to an embodiment of the present invention. The player device 200 comprises a processor 210, such as one or more INTEL® Pentium® processors, coupled to a communication device 220 configured to communicate via a communication network (not shown in FIG. 2). The communication device 220 may be used to communicate, for example, with the game controller 1100 and/or the payment device 110.

The processor 210 is also in communication with an input device 240. The input device 240 may comprise, for example, a keyboard, a mouse or other pointing device, a microphone, a knob or a switch (including an electronic representation of a knob or a switch), an infrared port, a docking station, and/or a touch screen. Such an input device 240 may be used, for example, by a player to play a game (e.g., by manipulating a pointer associated with a computer-based golf game).

The processor 210 is also in communication with an output device 250. The output device 240 may comprise, for example, a display (e.g., a computer monitor), a speaker, and/or a printer. The output device 250 may be used, for example, to provide game information to a player.

The processor 210 is also in communication with a storage device 230. The storage device 230 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 230 stores a program 215 for controlling the processor 210. The processor 210 performs instructions of the program 215, and thereby operates in accordance with the present invention. For example, the processor 210 may arrange for a player to play a game of skill by receiving information from, and/or transmitting information to, a remote game controller 1100.

As used herein, information may be "received" by or "transmitted" to, for example: (i) the player device 200 from the game controller 1100; or (ii) a software application or module within the player device 200 from another software applicdt nv, module, or any other source.

Figure 3:
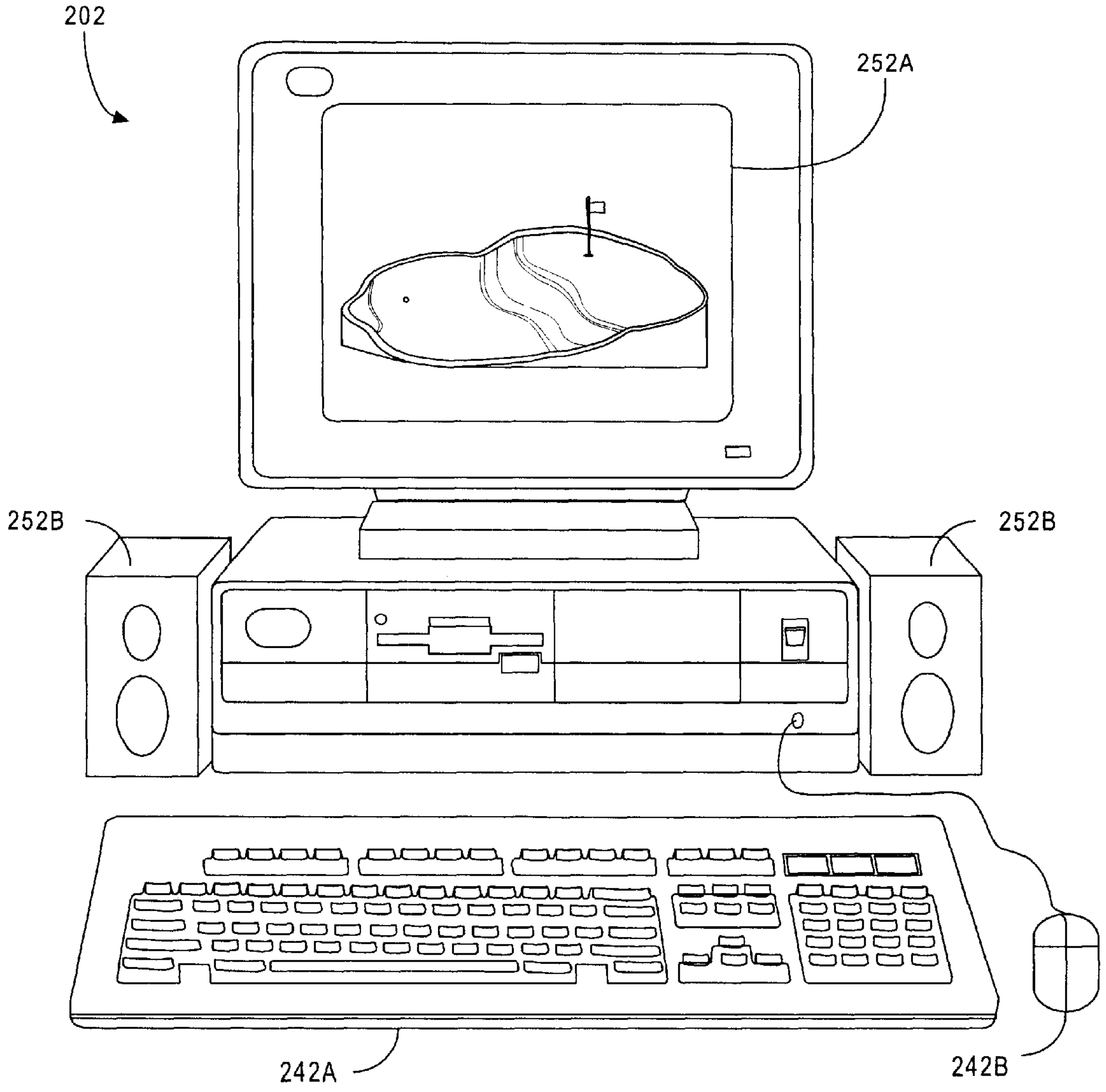
FIGS. 3 through 5 illustrate player devices according to some embodiments of the present invention.

FIG. 3 illustrates a PC 202 displaying game information according to an embodiment of the present invention. The PC 202 includes a keyboard 242A and a mouse 242B which can be used by a player to play a game of skill. The PC 202 also includes a computer display 252A and speakers 252B which can be used, for example, to provide game information to a player.

Figure 4:
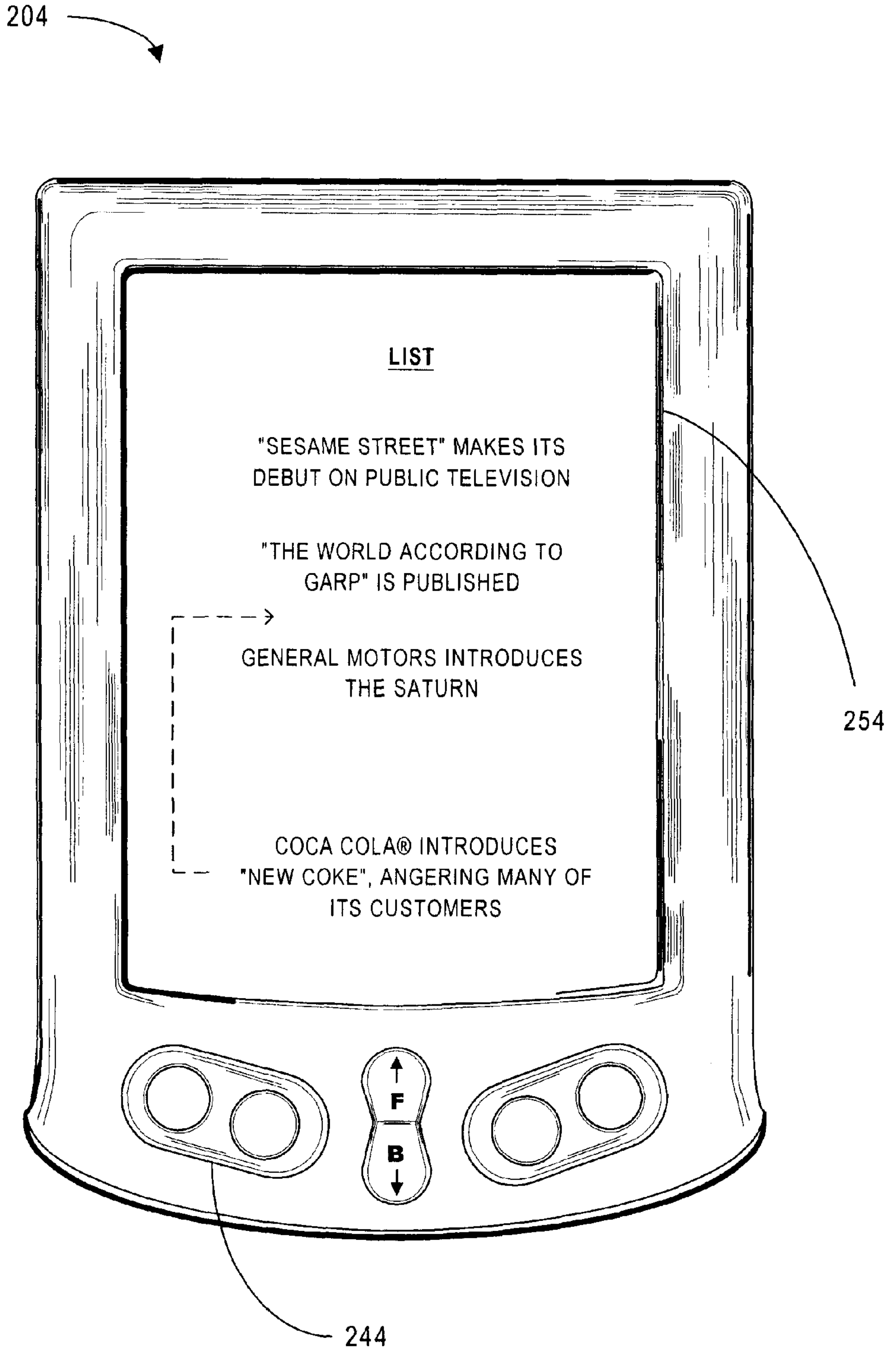
Figure 5:
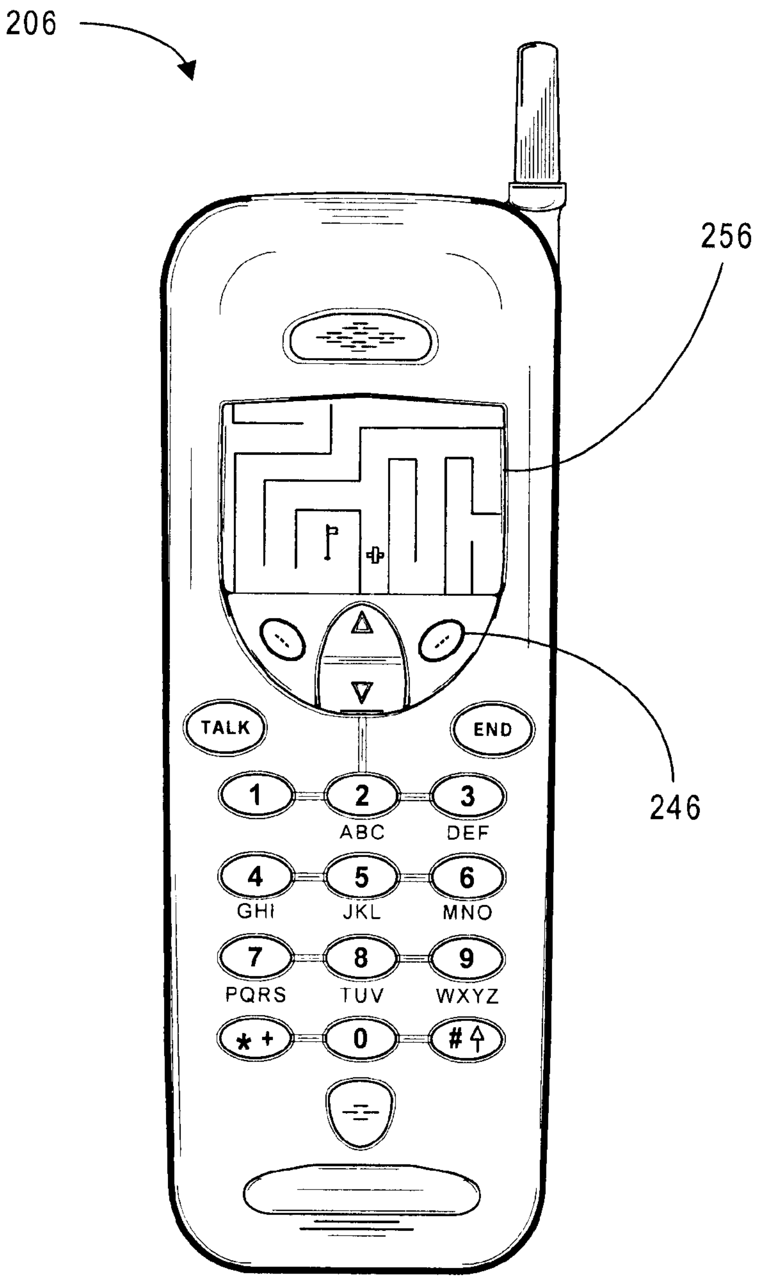

FIG. 4 illustrates a PDA 204 displaying game information according to another embodiment of the present invention. The PDA 204 includes an input device 244 and an output device 254 (e.g., a display screen) that may be used by a player to play a game. Similarly, FIG. 5 illustrates a wireless telephone 206 including an input device 246 and an output device 256 displaying game information.

Game Life Cycle

Figure 6:
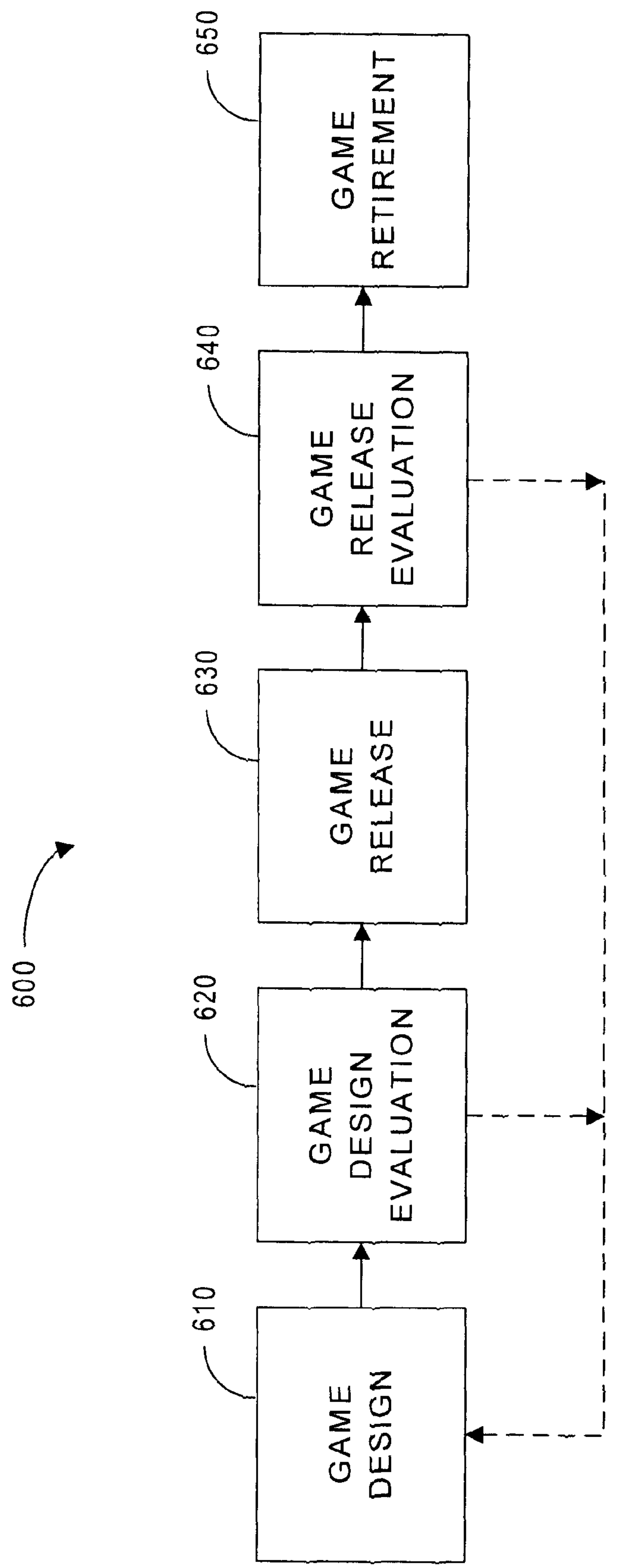
FIG. 6 is a game life cycle flow diagram according to an embodiment of the present invention.

FIG. 6 is a game life cycle 600 flow diagram according to an embodiment of the present invention. At 610, a game provider designs a game. For example, the game provider may develop an initial concept for a game associated with a physics simulation, a trivia game, a puzzle game (e.g., a word puzzle game or a graphical puzzle game), or an arcade-style game. Typically, the game design will include a set of rules and goals associated with the game. The game design may also include, for example, a prize structure and/or a theme associated with the game.

Of course, the game provider may develop a number of different types of games (e.g., to include something for everyone while focusing on the most popular game segments). Based on the success of prior games, the game provider may, of course, identify the most profitable, frequent player segments and game development can focus on meeting those needs, as well as expanding to new player segments.

To aid the design of games, the game provider may develop a series of core game engines that contain the essential play patterns for various primary game types (e.g., parameter, logic, word, and trivia-based games). As an example, a hole-in-one golf game engine can be modified, or "skinned," and used for an archery game or a football field goal kicking game—where the core play pattern of "aiming and releasing an object toward a specific target" is the same in all three games. Such a strategy may let the game provider leverage production costs against multiple games and free-up resources to create new ones.

The game design is then evaluated at 620. An game design may be evaluated, for example, by a number of expert game designers who estimate a level of skill required to play the game. The game design may also be evaluated to determine a susceptibility of the game to the use of automated game playing devices 260.

Other aspects of game design may be evaluated as well. For example, the game provider may wish to focus on building a game play experience that appeals to a mass audience, encourages frequent visits, entices repeat play, and maximizes reinvestment of winnings. This may achieved, for example, by using simple, familiar play patterns (e.g., so that an initial learning curve is quick and most players already have a knowledge of, and an affinity for, the games).

A game design may also be evaluated to determine if the game provides a sufficient level of "instant gratification." For example, the game provider may design games that are quick to resolve, such as games having three to five minutes of play time before a player finds out if he or she wins. In this case, a player will not need to wait for A game design may also be evaluated to make sure that winning feels achievable to a player. That is, a player should recognize the skills needed to win a game as skills that he or she already has. Of course, the player's skills may improve the more he or she plays the game. A successful game design may also regularly provide feedback to the player in the form of audio, animation, and custom messaging to contribute to the excitement of the game play and the winning experience.

Moreover, prize models may be carefully crafted to ensure that lower value prizes can be won frequently (e.g., one in every three games played) and that players will feel that they were "close" even if they don't win a larger prize. In particular, a successful prize model may be designed to deliver an exciting, rewarding play experience to players, while managing the risk and profitability of the game provider. To do so, a game design may be evaluated using human and computer-enhanced game play results to understand the range of game play outcomes and the frequency of different achievements. The game provider may then use these results to set hurdles and prize amounts to meet target objectives. In addition, the game provider may retain experts to play the games over a period of time, in order to assess the performance of the best players.

The prize model may also be evaluated with respect to different prize levels. For example, smaller prizes (e.g., less than five dollars) may provide the player with a positive reward experience which inspires repeat play and retention. Larger prizes (e.g., from five dollars to one thousand dollars) may stimulate viral marketing as players brag about their accomplishments. Still larger prizes (e.g., from one thousand dollars to one million dollars) may keep people playing and re-investing their winnings towards another chance to win. By balancing various prize levels, the game provider may achieve frequent, repeat game play, viral marketing and re-investment of winnings.

Figure 7:
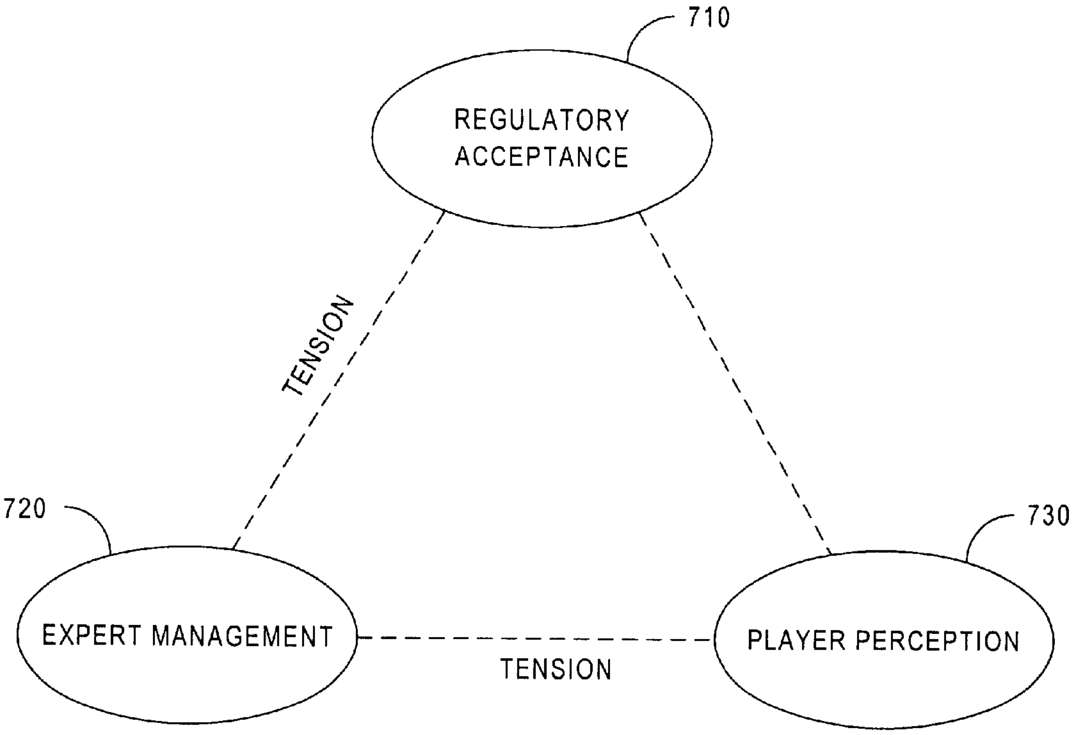
FIGS. 7 and 8 illustrate game design considerations according to some embodiments of the present invention.
Figure 8:
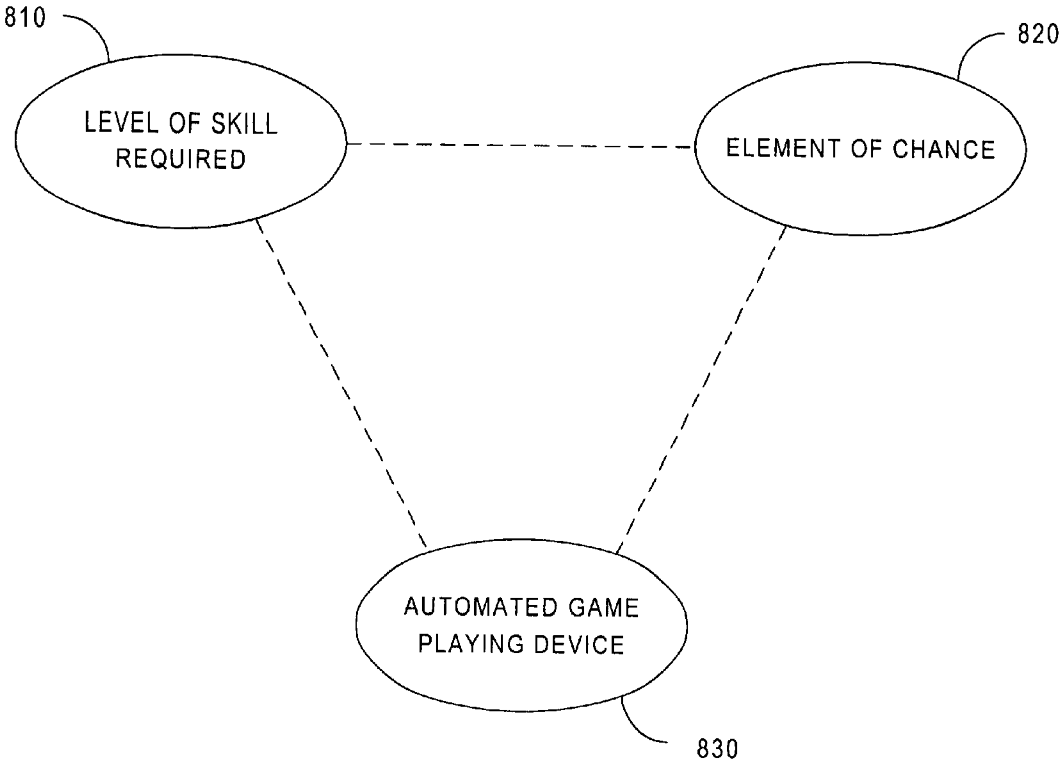

Various other factors that can be considered when evaluating a game design are described with respect to FIGS. 7 and 8.

According to one embodiment, the game design is evaluated after a sample group of players have played the game (e.g., by playing a prototype of the game incorporating some or all of the rules and goals associated with the game). Information associated with the sample group of players (e.g., player performance data) is then analyzed to determine, for example, a level of skill associated with the game. Information associated with the sample group of players can also be analyzed to establish a prize structure and/or to predict a financial result associated with the game (e.g., whether or not the game will be profitable for the game provider).

Based on the result of the game design evaluation 620, the game provider may revisit the game design 610 and adjust the initial concept of the game as appropriate. Various techniques that may be used to develop an initial concept or to modify a game design are described with respect to FIG. 10.

If the game design evaluation 620 has a satisfactory result, the game is "released" to the general public at 630. That is, the game provider may finalize the game (e.g., by creating a final version of game software) and begin collecting fees from players and awarding prizes to players based on game play. The release of the game is then evaluated at 640. That is, information associated with actual players (as opposed to a sample group of players) is analyzed to determine, for example, a level of skill and/or a financial result associated with the game. Based on the evaluation of the game release, the game provider may again refine the game design at 610 (e.g., by modifying a rule, a goal, or a prize structure associated with the game).

The release of the game may also be evaluated, for example, with respect to risk management. That is, the game provider may carefully monitor players' prize awards and the winning frequency to identify suspicious player performance or an overly generous prize payout. Automatic triggers may notify the game provider of risky results, and may even temporarily lock out a player or shut down a game until the game provider can investigate. By way of example only, players may be prevented from winning a top prize (e.g. one million dollars) more than once.

At some point, the game release evaluation at 640 may indicate that the game should be "retired" at 650. For example, expert players may begin to dominate game play and receive an unacceptable amount of the prizes. In this case, the game provider may decide to stop offering the game to players. According to another embodiment, players are still allowed to play a retired game but are no longer required provide fees and/or cannot win prizes based on game play.

Game Design Considerations

FIGS. 7 and 8 illustrate game design considerations according to some embodiments of the present invention. These factors may be considered by a game provider, for example: (i) when an initial game concept is developed, (ii) when an initial game concept is being reviewed, (iii) after a sample group of players have tested the game, and/or (iv) after the game has been released. Of course, the game provider will typically consider other factors as well, including how enjoyable the game is and how difficult the game will be to implement (e.g., how difficult it will be to write software programs to enable game play or to build a database of appropriate trivia questions).

As shown in FIG. 7, regulatory acceptance 710 is one factor that may be considered by a game provider when evaluating a game design. If a player will provide a payment and receive a prize based on game play, the game provider will want to make sure that the player's skill is more significant in the determination of a game result than any element of chance that might also be present. That is, the game designer will want to make sure that the game will be considered a "game of skill" instead of "gambling" (i.e., the game will comply with legal and statutory requirements regarding pay to play games for cash prizes). For example, the game provider may institute analytic methods to ensure that games are won predominantly through the application of skill. In addition, experts in various fields (e.g., cognitive psychology and legal counsel) may review and approve each game before the game is released. Finally, the accuracy and integrity of game play algorithms may be reviewed and verified by outside experts.

For example, a game may simulate real-world forces in connection with a physics simulation (e.g., an undisclosed wind speed and direction may be randomly generated by a game controller 1100). In this case, the game provider will want to make sure that the player's skill in the game is more significant to the determination of a game result than the real-world forces. Moreover, the game provider may want to ensure that game results, and any simulations used to produce those game results, can be audited and verified by outside experts (e.g., a physics expert may review a physics simulation).

The game provider may also consider expert management 720 when evaluating a game design. Note that an expert player may comprise any party who is able to dominate a game and win excessive amounts of cash. Experts may be exceptional human players or players who cheat by using computer-enhanced methods (e.g., via an automated game playing device 260). In general, the game provider will attempt to design a game of skill that expert players cannot dominate (or that will be difficult for them to dominate).

For example, a game may be based on real life probabilities that effectively limit an expert player's advantage. Consider a computer-based golf simulation in which a player is awarded a large prize if he or she shoots a "hole-in-one." In this case, the likelihood of even an expert player shooting a hole-in-one may be small enough (e.g., one in a million) so as to prevent expert players from dominating the game. A game design can also incorporate one or more variable elements to prevent expert players from completely mastering the game. For example, a variable, undisclosed wind speed and direction may be used to limit an advantage enjoyed by expert players.

Another factor that the game provider may consider is player perception 730. In addition to designing a game that is fun to play, the game provider must make sure that a player feels that he or she can realistically achieve winning game result (if not, the player may become discouraged and stop playing the game). Moreover, player perception 730 may dictate an appropriate prize structure. For example, a player's enjoyment will typically be increased if he or she frequently wins prizes (even small prizes) and there is at least some chance of winning a larger prize.

Note that the goals of expert management 720 can create tension with the goals of regulatory acceptance 710. In other words, relying too heavily on a variable element to determine a game result (e.g., by using a randomly determined wind speed and direction) might cause a game to be considered gambling as opposed to a game of skill.

Similarly, the goals of expert management 720 can create tension with the goals of player perception 730. For example, if a game provider relies too heavily on a variable element to determine a game result, a player may feel that the game is unfair because it is not really based on his or her skill. On the other hand, a player may also feel that a game is unfair if expert players dominate game play (and prizes).

FIG. 8 illustrates game design considerations from another perspective. In particular, regulatory acceptance 710 as it was described with respect to FIG. 7 may be based on a level of skill required 810 to play a game as compared to an element of chance 820 present during game play.

The level of skill required 810 may represent, for example, a degree to which player input parameters (e.g., his or her selection of a speed and angle associated with a swing of a simulated golf club) are used to determine a game result. On the other hand, the element of chance 820 may represent a degree to which factors outside the player's control (e.g., an undisclosed wind speed and direction) can influence the game result. In general, the game provider will want to ensure that the level of skill required 810 is more important in the determination of a game result than the element of chance 820 (so that the game will be considered a game of skill instead of gambling).

By way of example, consider the level of skill required 810 with respect to a graphical puzzle game in which a player clicks on contiguous chains of similar icons to remove them from a board. The larger this chain, the more points are scored, and the player receives a bonus if he or she clears the board entirely. In this case, the level of skill required 810 may be associated with the player's logic and strategy in choosing moves which both (i) score points and (ii) set up chains to score even more points. Other skills involved may include pattern recognition, strategy selection, and/or visual-motor coordination.

As another example, consider a word game in which a player is presented with a five-by-five grid having vertical columns and horizontal rows. The player is then given twenty five letters, one at a time, which must be placed permanently into the grid. The object is to form as many words as possible across each row and down each column. Players receive different point values for each three, four, and five letter word they create. A perfect score is achieved when five five-letter words are formed both across and down. In this case, the level of skill required 810 may be associated with reading and word skills to decide on the best letter placement, knowledge of English language patterns, logical reasoning to plan strategies, and memory retrieval to recall vocabulary As still another example, consider a golf game in which a player is presented with a three-dimensional putting green.

Based on the putting green, the player chooses a force and direction with which to hit a golf ball. The object of the game is to get as many balls, of six provided, into the golf hole (or as close to the golf hole as possible) from various positions on the putting green. In this case, the level of skill required 810 may be associated with proficiency in reading and interpreting the putting green, estimating the correct force and direction to hit the golf ball, and hand-eye coordination needed to properly input the desired force.

As still another example, consider a game in which a player places famous events in chronological order. On each turn, the player chooses one of three events (worth 100, 250, and 500 points) to place into a timeline. The game ends when he or she incorrectly places five events into the timeline. In this case, the level of skill required 810 may be associated with reading and comprehension of the events, memory retrieval of the years in which the events took place, arithmetic reasoning in comparing the years of the selected event with other events in the timeline, and logical reasoning to assist in the placing of the events.

Another factor that may be considered by the game provider is a potential susceptibility of the game to various automated game playing devices 830. That is, the game provider will want to limit the extent to which a player can use an automated game playing device 830 to unfairly win prizes. For example, the game provider may attempt to limit a player's ability to use an automated game playing device by not disclosing a wind speed and direction to the player (i. e., by not transmitting that information to a player device 200). Note, however, that such an approach must be carefully applied to make sure that the level of skill required 810 to play the game is still appropriate in view of the element of chance 820.

Game Design and Modification Methods

Figure 9:
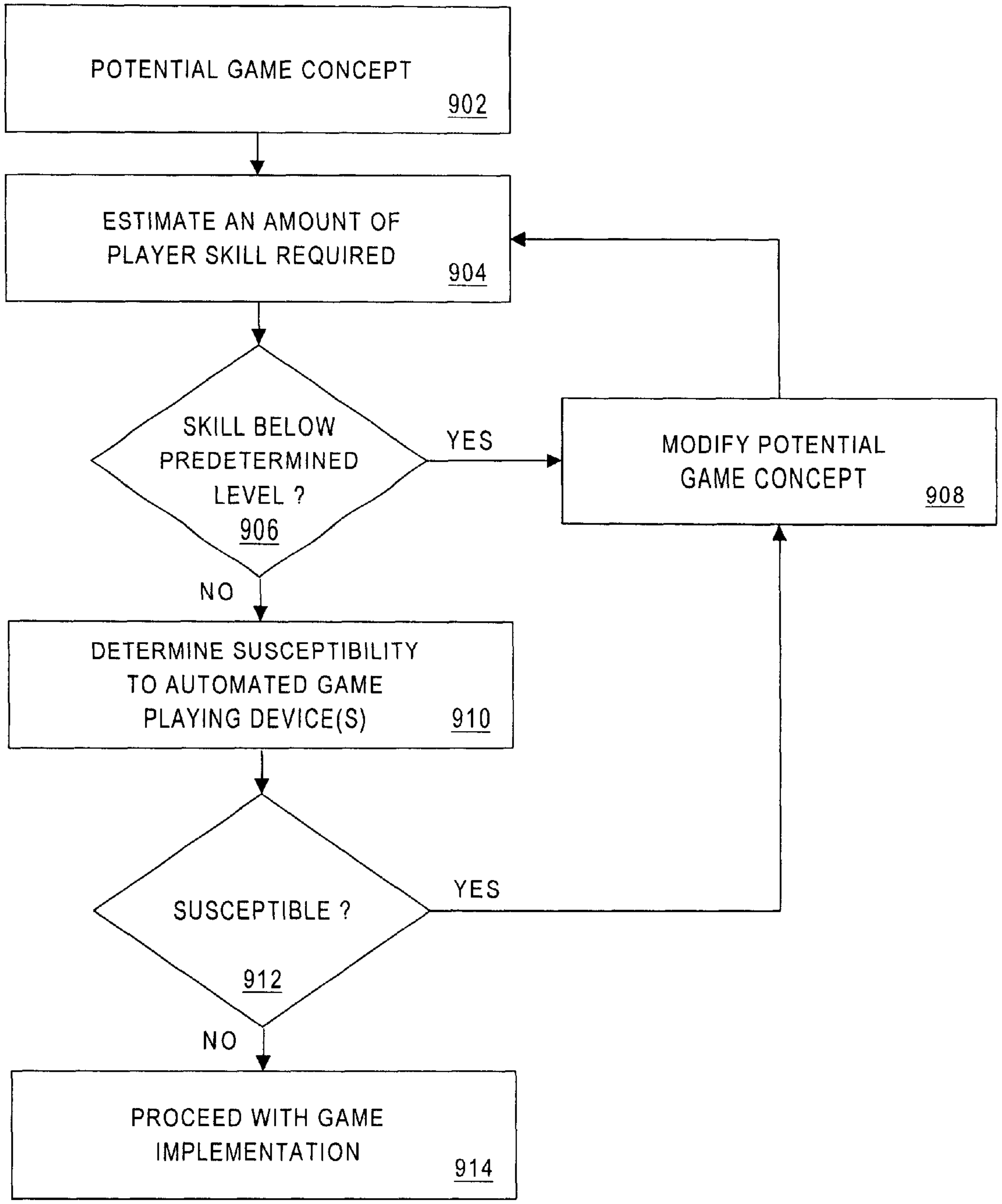
FIG. 9 is a flow chart of a method for designing a game according to an embodiment of the present invention.

FIG. 9 is a flow chart of a method for designing a game according to an embodiment of the present invention. Various elements of method shown in FIG. 9 may be performed, for example, by a game provider and/or the game controller 1100. The flow charts in FIG. 9 and the other figures described herein do not imply a fixed order to the steps, and embodiments of the present invention can be practiced in any order that is practicable. Moreover, the methods may be performed by any of the devices described herein.

At 902, a potential game concept is determined. For example, the game provider may develop an initial concept for a game associated with a physics simulation, a trivia game, a puzzle game, or an arcade-style game. The potential game concept may include, for example, a set of rules, goals associated with the game, a prize structure, and/or a theme associated with the game.

An amount of player skill required to play the game is then estimated at 904. This estimation may be performed, for example, by one or more expert game designers. According to one embodiment, the amount of player skill required is evaluated by having a sample group of players play the game (e.g., by playing a prototype of the game that includes some or all of the rules and goals associated with the game). Information associated with the sample group of players (e.g., player performance information) can then be analyzed to determine, for example, a level of skill associated with the game.

If the level of skill is below a predetermined level at 906 (e.g., if the level of skill is unacceptable and/or does not predominate over an element of chance associated with the game), the potential game concept is modified at 908. Various approaches that may be used to modify the potential game concept are described with respect to FIG. 10.

At 910, a susceptibility of the potential game concept to an automated game playing device is determined. For example, a game designer may determine that a player could unfairly program his or her PC to quickly generate answers to game questions. If the potential game concept is too susceptible to automated game playing devices at 912, the potential game concept is modified at 908. Otherwise, the game provider may proceed with game implementation (e.g., by finalizing the game design and releasing the game to the general public).

Figure 10:
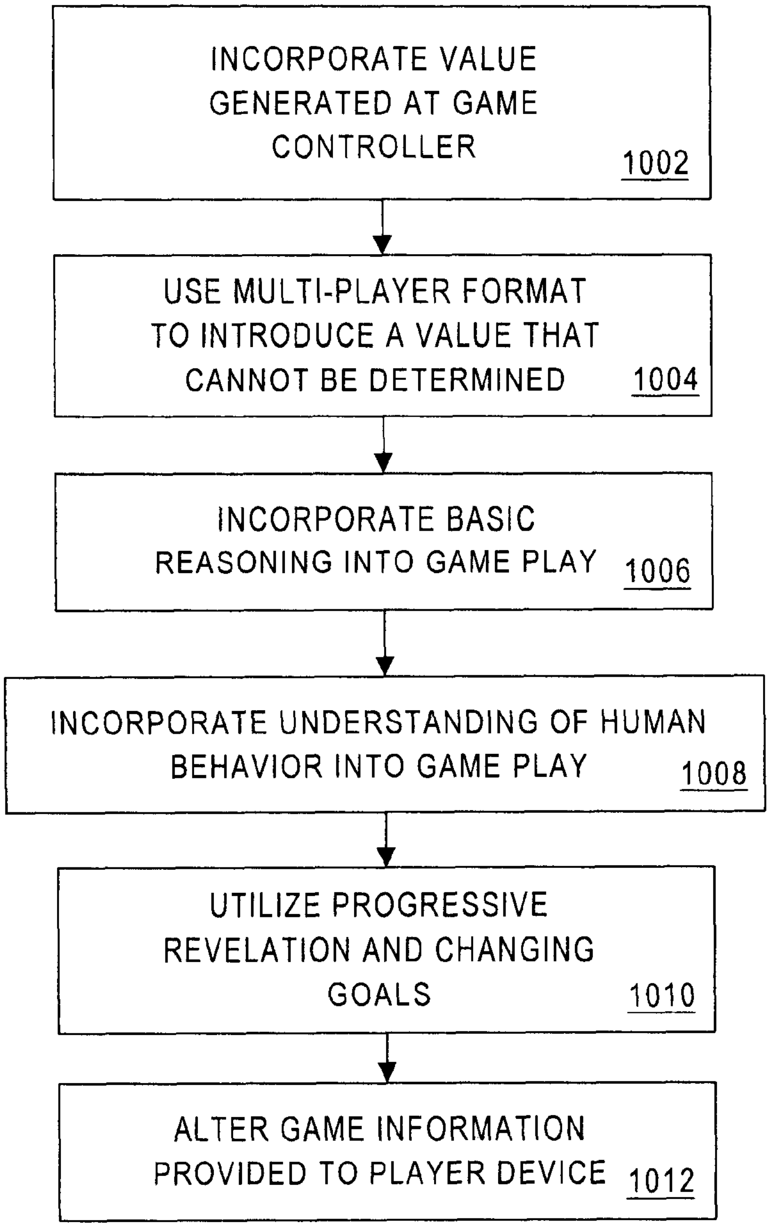
FIG. 10 is a flow chart of a method for determining a potential game concept and/or modifying a game design according to an embodiment of the present invention.

FIG. 10 is a flow chart of a method for determining a potential game concept and/or modifying a game design according to an embodiment of the present invention. The method shown in FIG. 10 may be performed, for example, by a game provider. Note that not all of the steps shown in FIG. 10 will normally be performed with respect to a single game.

At 1002, a value generated at the game controller 1100 is incorporated into game play. For example, the game controller 1100 may randomly generate a value without transmitting the value to the remote player device 200. In this way, an automated game playing device 260 will be unable to generate a response on behalf of the player that correctly takes this value into account.

Consider, for example, a game associated with a physics simulation such as a golf game (e.g., a golf putting game), an archery game, a moving water game (e.g., a whitewater rapids game), a racing game, a fishing game, a sports game (e.g., a baseball, basketball, football, soccer, or hockey game), a bowling game, a billiards game, a throwing game, a ring-toss game, a shooting game, or a space game. In this case, a player input parameter and the randomly generated value may be input into the physics simulation to determine a game result. Examples of such a randomly generated values include wind information (e.g., a wind speed and direction), atmospheric information, terrain information, and object information (e.g., an irregularity in a simulated golf ball's shape).

According to another embodiment, the undisclosed value is not randomly generated. For example, the game controller 1100 may generate the value by receiving actual wind speed and direction information from a golf course. As another example, the game controller 1100 can generate the value by retrieving a pre-stored value from a database.

At 1004, a multi-player format is utilized to introduce a value that cannot be determined by the remote player device 200 and/or an automated game playing device 260. For example, a first player may select a wind speed and direction for a second player.

Basic reasoning is incorporated into game play at 1006 to discourage the use of an automated game playing device 260. For example, a player may be asked to solve a puzzle in such a way that a true statement is revealed (e.g., "the sky is blue"). In this way, it will be difficult to create an automated game playing device 260 that can recognize which statements are true (e.g., whether the puzzle should reveal that "the sky is blue" or that "the sky is red"). Note that such a feature may not have a significant effect on game play by human players (e.g. it can be assumed that almost every human player knows that the sky is blue).

Similarly, an understanding of human behavior is incorporated into game play at 1008. For example, a player may be asked to select which of five movie stars were the most popular in a recent survey. Because the answer requires an understanding of human behavior (e.g., an understanding of what other people think), it will be difficult to create an automated game playing device 260 that can give a player an unfair advantage.

At 1010, elements of the game are revealed to the player (and transmitted to the player device 200) in a progressive manner. For example, only a portion of maze might be transmitted to the player device 200. In this way, it will be difficult to create an automated game playing device 260 that calculates a successful path through the entire maze. Similarly, one or more goals to be achieved by a player may be changed during game play. For example, various bonus "flags" placed within a maze might be moved during game play (e.g., each time the player obtains one of the flags) to prevent an automated game playing device 260 from calculating an optimal route to all of the flags.

At 1012, game information displayed to a player (and transmitted to the player device 200) is altered. For example, a putting green terrain might be slightly altered before being transmitted to the player device 200. As a result, the performance of an automated game playing device 200 that attempts to calculate the roll of a simulated golf ball over the terrain will be hampered. Note that the game information may be altered so as to hamper the performance of an automated game playing device 260 more than that of a human player. Several such systems and methods are described in U.S. patent application Ser. No. 09/714,558 entitled "Systems and Methods for Altering Game Information Indicated to a Player" and filed on Nov. 16, 2000, the entire contents of which are incorporated herein by reference.

Game Controller

Figure 11:
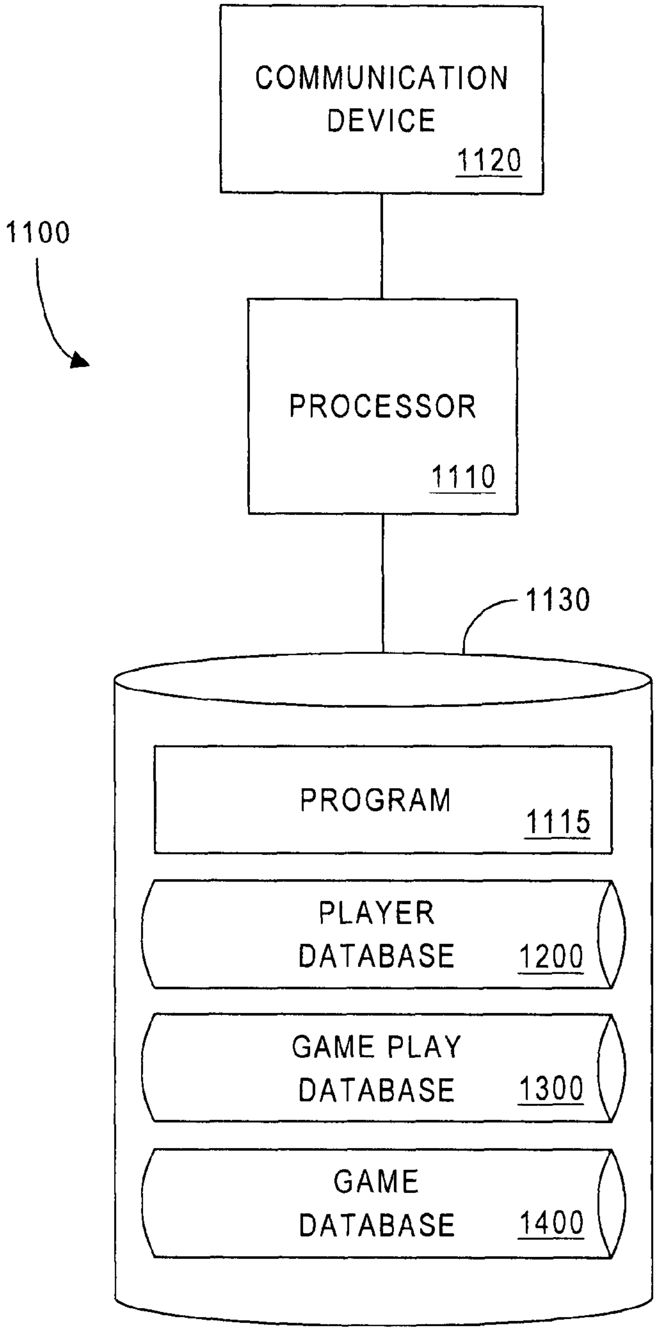
FIG. 11 is a block diagram of a game controller according to an embodiment of the present invention.

FIG. 11 illustrates a game controller 1100 that is descriptive of the device shown in FIGS. 1A and 1B according to an embodiment of the present invention. The game controller 1100 comprises a processor 1110, such as one or more INTEL® Pentium® processors, coupled to a communication device 1120 configured to communicate via a communication network (not shown in FIG. 11). The communication device 1120 may be used to communicate, for example, with one or more player devices 200 and/or the payment device 110.

The processor 1110 is also in communication with a storage device 1130. The storage device 1130 may comprise any appropriate information storage device, including combinations of magnetic storage devices (e.g., magnetic tape and hard disk drives), optical storage devices, and/or semiconductor memory devices such as RAM devices and ROM devices.

The storage device 1130 stores a program 1115 for controlling the processor 1110. The processor 410 performs instructions of the program 415, and thereby operates in accordance with the present invention. For example, the processor 1110 may arrange for a player to provide payment of a fee in exchange for playing a game of skill. The processor may also receive a player input parameter from a remote player device 200 and determine a game result based on the player input parameter and a value. The value may be, for example, generated at the game controller 1100 without being communicated to the remote player device 200 prior to the determination of the game result. The processor 1110 may then arrange for the player to receive a prize based on the game result.

According to another embodiment, the processor 1110 receives from a player a fee to play a game of skill that inhibits performance of an automated game playing device 260. The processor 1110 also receives a player input parameter from a remote player device 200 and determines a game result based on the player input parameter. The processor 1110 then provides a prize to the player based on the game result.

According to another embodiment, a potential game to be played by a player via a remote player device 200 is determined. The processor 1110 then evaluates the potential game to estimate an amount of player skill required to play the potential game (e.g., by evaluating performance data associated with a sample group of players). The processor 1110 also evaluates the potential game to determine an ability of an automated game playing device 260 to play the potential game. According to one embodiment, the processor 1110 also modifies the potential game if (i) the amount of player skill required is below a threshold amount or (ii) the ability of the automated game playing device is above a threshold amount. For example, the processor 1110 may adjust the effect of a random variable in game play until the amount of player skill required is equal to a desired amount.

The program 1115 may be stored in a compressed, uncompiled and/or encrypted format. The program 1115 may furthermore include other program elements, such as an operating system, a database management system, and/or device drivers used by the processor 410 to interface with peripheral devices.

As used herein, information may be "received" by or "transmitted" to, for example: (i) the game controller 1100 from the player device 200; or (ii) a software application or module within the game controller 1100 from another software application, module, or any other source.

As shown in FIG. 11, the storage device 1130 also stores a player database 1200 (described with respect to FIG. 12), a game play database 1300 (described with respect to FIG. 13), and a game database 1400 (described with respect to FIG. 14). Examples of databases that may be used in connection with the game systems 100, 102 will now be described in detail with respect to FIGS. 12 through 14. The illustrations and accompanying descriptions of the databases presented herein are exemplary, and any number of other database arrangements could be employed besides those suggested by the figures.

Player Database

Referring to FIG. 12, a table represents the player database 1200 that may be stored at the game controller 1100 according to an embodiment of the present invention. The table includes entries identifying players who play games of skill via the game system 100, including members of a test group of players and/or the general public. The table also defines fields 1202, 1204, 1206, 1208, 1210 for each of the entries. The fields specify: a player identifier 1202, a name 1204, contact information 1206, a payment identifier 1208, and an account balance 1210. The information in the player database 1200 may be created and updated, for example, based on information received from player when he or she registers with the game controller 1100. The information in the player database 1200 may also be based on, for example, information generated as players play games of skill via the game system 100.

The player identifier 1202 may be, for example, an alphanumeric code associated with a player who has registered to use the game system 100. The player identifier 1202 may be generated by, for example, the game controller 1100 or the player (e.g., when the player provides a user name and password). According to one embodiment, the player identifier 1202 is also stored on a remote player device 200 (e.g., as part of a browser "cookie" file). The player database 1200 also stores the name 1204 and contact information 1206 (e.g., a postal address, an electronic mail address, an IP address, or a telephone number) associated with each player.

The payment identifier 1208 may comprise, for example, a credit card, debit card or bank account number (e.g., a checking account number) or digital payment protocol information. The payment identifier 1208 may be used, for example, by the game controller 1100 to arrange for the player to provide or receive a payment.

The account balance 1210 represents an amount that has been provided by the player (e.g. via his or her credit card account) in exchange for game play and/or an amount that has been (or will be) provided to the player based on his or her performance (e.g., a total amount that has been won by the player). The account balance 1210 may be increased, for example, when a player provides a fee in exchange for game play and when a player wins a prize. The account balance 1210 may be decreased, for example, when he or she plays a game and when payment is provided to the player (e.g., he or she receives a check representing an amount won during the month).

Game Play Database

Referring to FIG. 13, a table represents the game play database 1300 that may be stored at the game controller 1100 according to an embodiment of the present invention. The table includes entries identifying games that have been played by players via the game system 100. The table also defines fields 1302, 1304, 1306 for each of the entries. The fields specify: a game play identifier 1302, a player identifier 1304, and a game result 1306. The information in the game play database 1300 may be created and updated, for example, based on information generated as players play games of skill via the game system 100.

The game play identifier 1302 may be, for example, an alphanumeric code associated with a game that has been played by a player. The game play identifier 1302 may be generated, for example, by the game controller 1100. The player identifier 1304 may be, for example, an alphanumeric code associated with a player who has registered to use the game system 100. The player identifier 1304 may be based on, or associated with, the player identifier 1202 stored in the player database 1200.

The game result 1306 may represent an amount that has been, or will be, provided to a player based on his or her performance in a game of skill (e.g., a prize awarded to the player based on game play). According to another embodiment, the game result 1306 instead represents one or more goals achieved by a player, such as a total score. The game provider may analyze the game results 1306 stored in the game play database 1300 to evaluate a game design (e.g., based on game results 1306 generated by a sample group of players and/or after the game has been released to the general public). The game provider may, for example, determine that a particular payout structure will not be (or is not) profitable and/or that game results 1306 are determined predominantly by a player's skill.

Game Database

Referring to FIG. 14, a table represents the game database 1400 that may be stored at the game controller 1100 according to an embodiment of the present invention. The table includes entries identifying games of skill that may be available via the game system 100. The table also defines fields 1402, 1404, 1406, 1408 for each of the entries. The fields specify: a game identifier 1402, a total game result 1404, an indication of whether the game has an appropriate learning curve 1406, and an indication of whether the game has an appropriate prize model 1408. The information in the game database 1400 may be created and updated, for example, based on information generated as players play games of skill via the game system 100.

The game identifier 1402 may be, for example, an alphanumeric code associated with a game that may be available via the game system 100. Note that the game identifier 1402 may be associated with the game play identifier 1302 stored in the game play database 1300. For example, the game play identifier 1302 may comprise the game identifier 1402 concatenated with an identifier associated with a particular game that was played.

The total game result 1404 represents a total amount that has been, or will be, paid by a game provider based on players' performance in the game of skill (e.g., prizes awarded to players based on game play). According to another embodiment, the total game result 1404 instead represents goals achieved players, such as an average total score. The game provider may analyze the total game result 1404 stored in the game database 1400 to evaluate a game design (e.g., based on total game results 1404 generated by a sample group of players and/or after the game has been released to the public). The game provider may, for example, determine that a particular game does (or does not) have an appropriate learning curve 1406 and/or an appropriate prize model 1408.

Game Analysis

Figure 15:
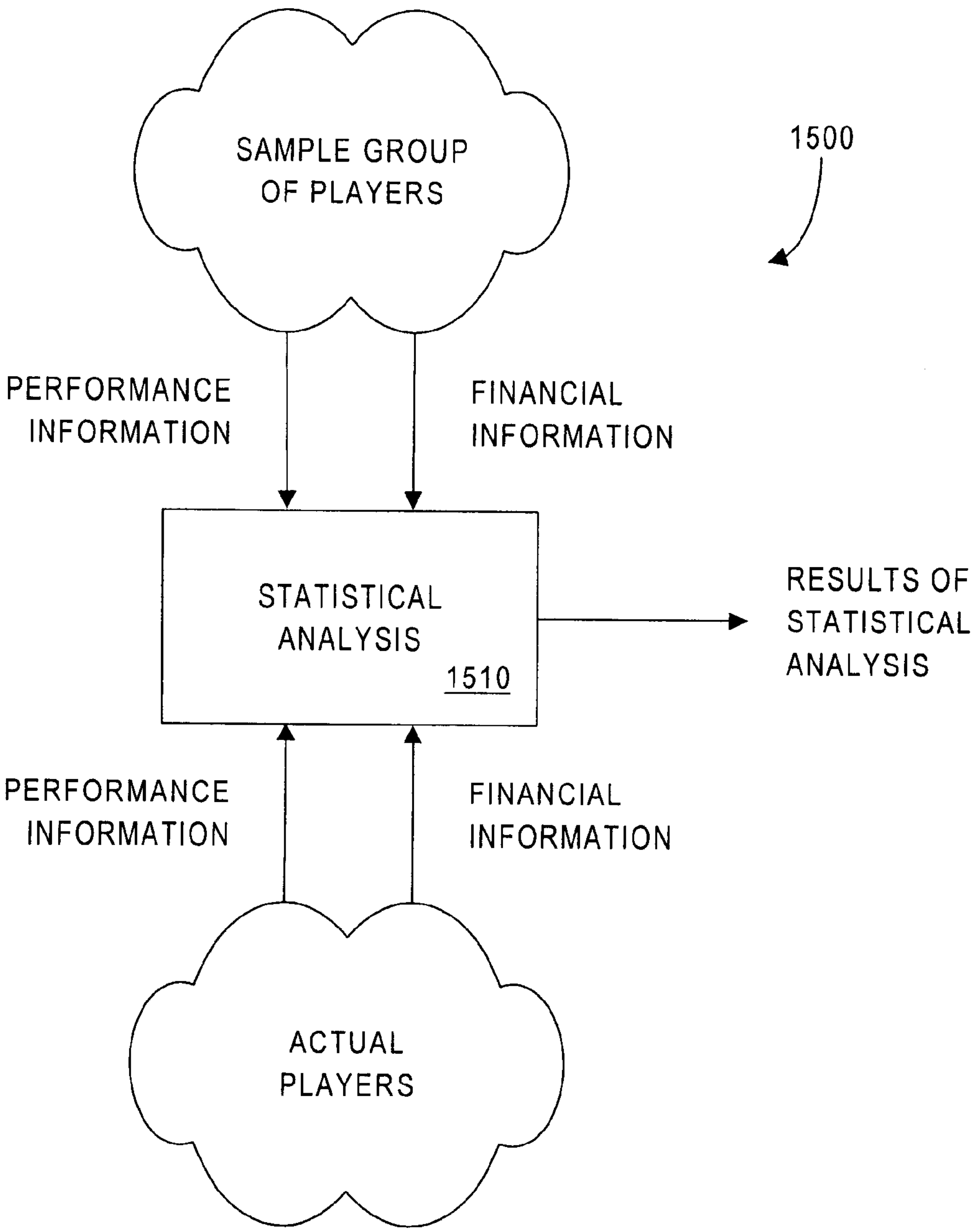
FIG. 15 is a block diagram of a system for monitoring game data according to an embodiment of the present invention.

FIG. 15 is a block diagram of a system 1500 for monitoring game data according to an embodiment of the present invention. As shown by FIG. 15, a statistical analysis 1510 may receive performance information associated with a sample group of players and generate a result. For example, the statistical analysis 1510 may analyze game results 1306 stored in the game play database 1300 and/or a total game result 1404 stored in the game database 1400 to determine if a game has an appropriate learning curve 1406 (e.g., indicating that the game is a game of skill as opposed to a game of chance). A graphical illustration of player performance data is provided with respect to FIG. 16.

Moreover, the statistical analysis 1510 may receive financial information associated with the sample group of players and generate a result. For example, the statistical analysis 1510 may analyze game results 1306 stored in the game play database 1300 and/or a total game result 1404 stored in the game database 1400 to determine if a game has an appropriate prize model 1408 (e.g., indicating that the game will be profitable for the game provider).

Similarly, the statistical analysis 1510 may receive performance information and/or financial information associated with actual players and generate one or more results of the statistical analysis 1510 (e.g., after a game has been played by the general public for a period of time).

Figure 16:
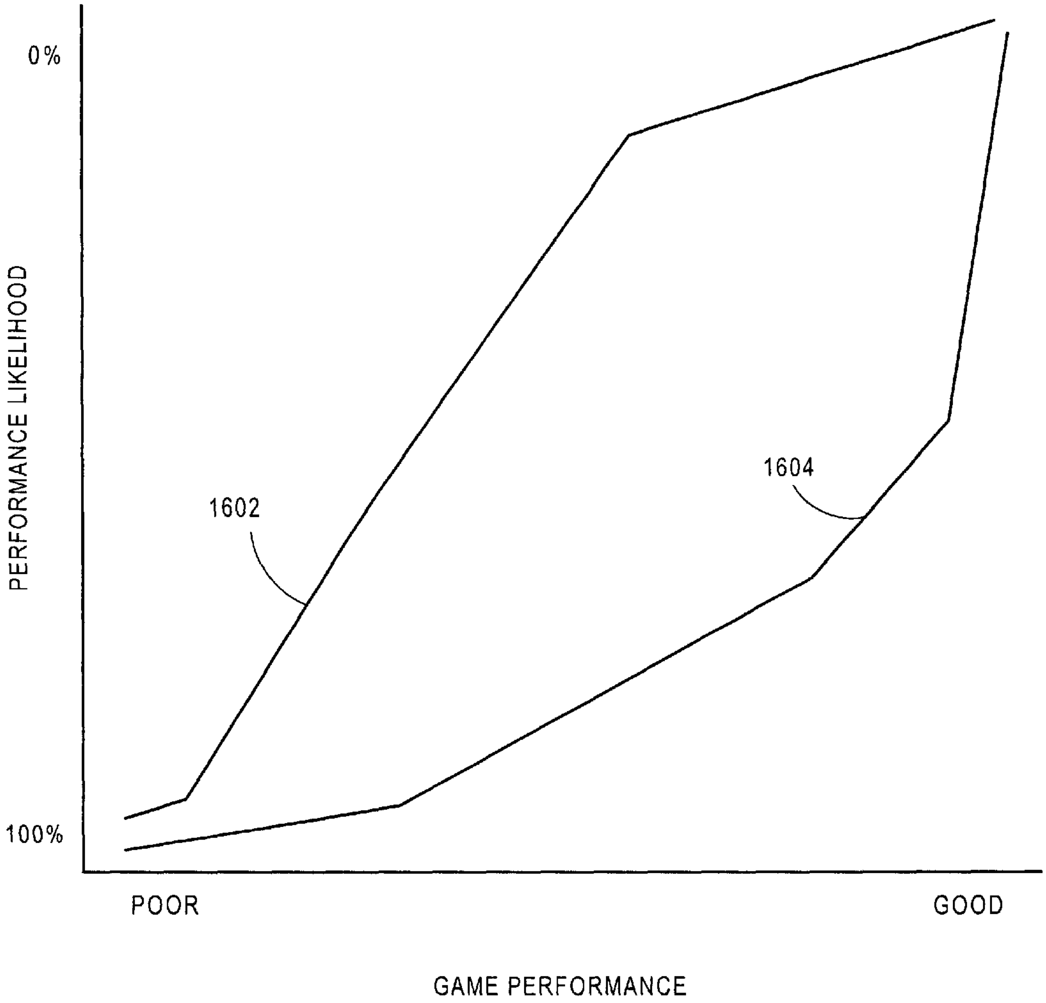
FIG. 16 is a graphical illustration of player performance data according to an embodiment of the present invention.

FIG. 16 is a graphical illustration of player performance data according to an embodiment of the present invention. As shown in FIG. 16, 100% of the players will perform at least as well as the worst game result with respect to a particular game (i.e., the performance likelihood is higher for poor performance levels). Similarly, few players will perform as well as the best game result (the performance likelihood is lower for better performance levels). It can be expected that different games (e.g., that have different play patterns and/or require different sets of player skills) will have different performance curves (e.g., as illustrated by the two curves 1602, 1604 shown in FIG. 16).

Game System Methods

Figure 17:
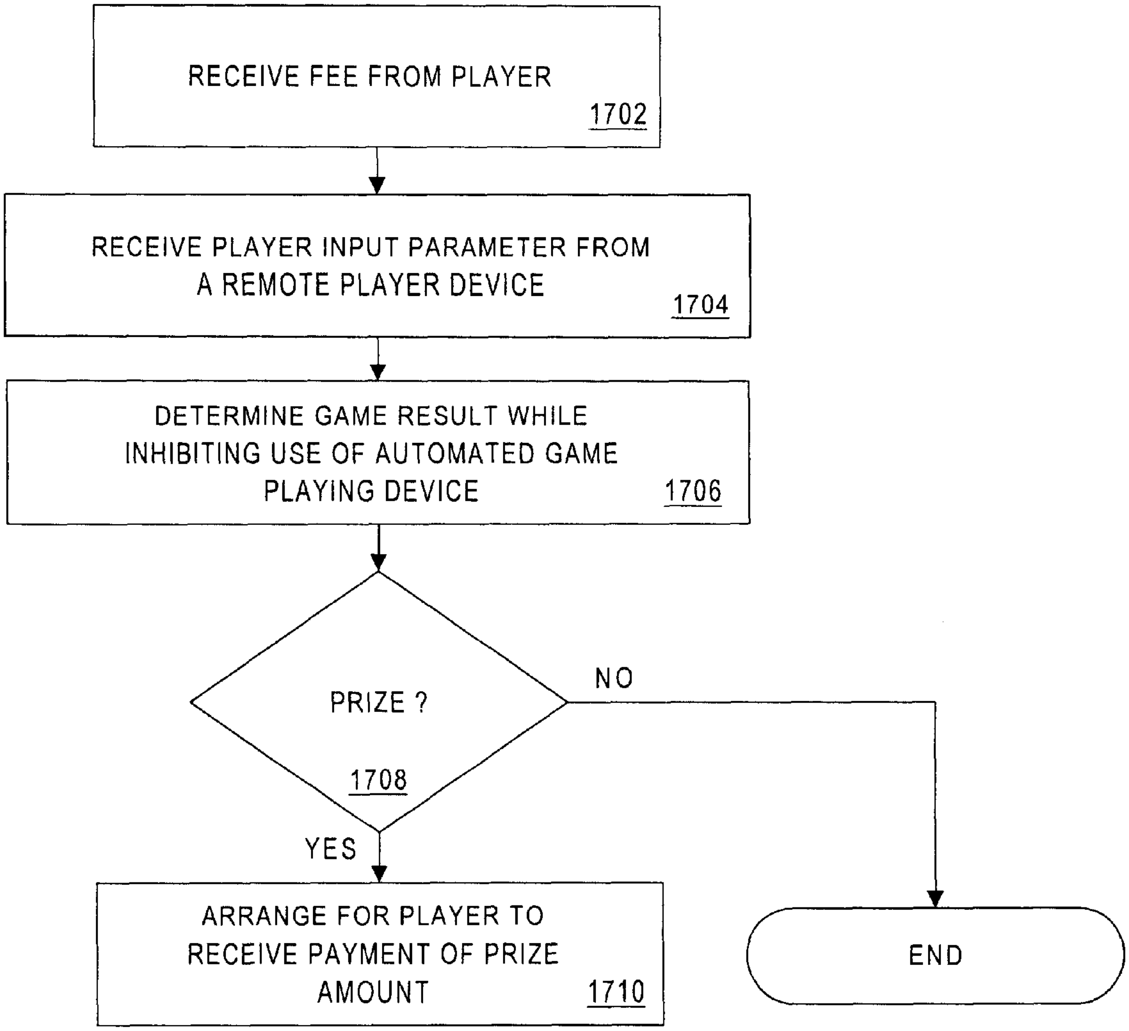
FIG. 17 is a flow chart of a method for facilitating game play according to an embodiment of the present invention.

FIG. 17 is a flow chart of a method for facilitating game play according to an embodiment of the present invention. The method may be performed, for example, by the game controller 1100 after a game has been released to the general public.

At 1702, the game controller 1100 arranges to receive a fee from a player in exchange for game play. For example, the game controller 1100 may use the payment identifier 1208 stored in the player database 1200 to arrange for the player to provide twenty dollars in exchange for game play (e.g., for the right to play forty games or the right to play games for thirty minutes). The game controller 1100 may also update the account balance 1210 stored in the player database 1200.

At 1704, the game controller 1100 receives one or more player input parameters from a remote player device 200. For example, the game controller 1100 may receive a speed and angle associated with a swing of a simulated golf club from a player's PC via the Internet. At 1706, the game controller 1100 determines a game result while inhibiting or hampering the use of an automated game playing device 260. For example, the game controller 1100 may calculate a trajectory for a simulated golf ball based on the player input parameter received at 1704 and a value that has not been transmitted to the player device 200 (e.g., a wind speed and direction). Note that an automated game playing device 260 would therefore be unaware of, and unable to account for, such a value.

At 1708, the game controller 1100 determines if a prize has been won by the player based on the game result. For example, the game controller 1100 may determine if a simulate golf ball has come to rest within a predetermined distance of a simulated golf hole. If the player has won a prize, the game controller 1100 arranges for the player to receive payment of a prize amount at 1710. The game controller 1100 may also update the account balance 1210 stored in the player database 1200, the game result 1306 stored in the game play database 1300, and/or the total game result 1404 stored in the game database 1400.

Figure 18:
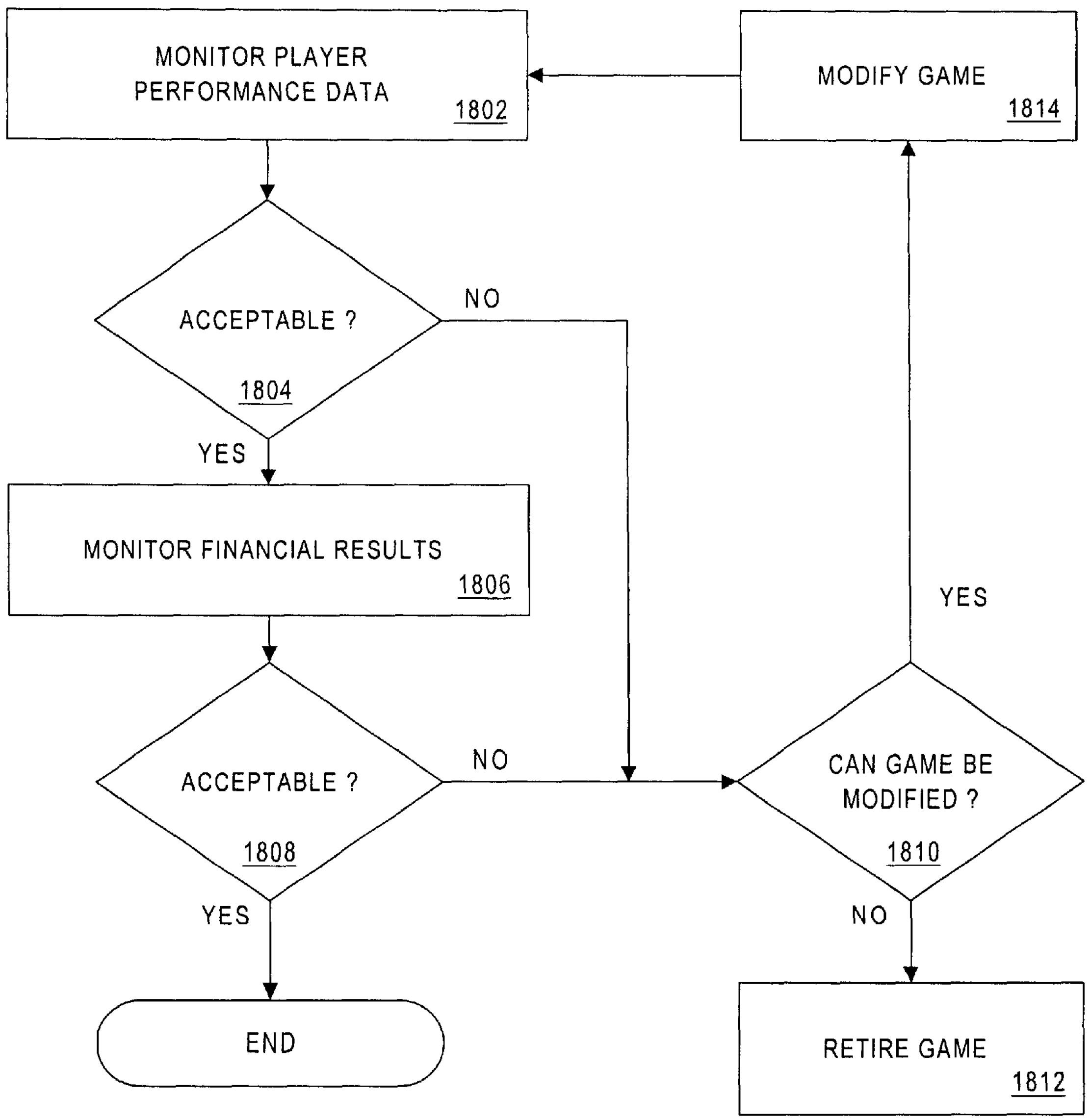
FIG. 18 is a flow chart of a method for monitoring game play according to an embodiment of the present invention.

FIG. 18 is a flow chart of a method for monitoring game play according to an embodiment of the present invention. At 1802, player performance data associated with a game is monitored. For example, a game provider may monitor performance information associated with a sample group of players (e.g., a test group of players or a representative subset of actual players) or with all players (e.g., after the game has been released to the general public). In either case, the game provider may analyze the game results 1306 stored in the game play database 1300 and/or the total game result 1404 stored in the game database 1400 to determine if a game has an appropriate learning curve (e.g., indicating that the game is a game of skill as opposed to a game of chance). A graphical illustration of player performance data is provided with respect to FIG. 16. An indication of whether the game is associated with an appropriate learning curve 1406 may then be stored in the game database 1400.

If the player performance data is not acceptable at 1804, it is determined if the game can be modified to improve the player performance data at 1810. If such a modification cannot be made, the game is retired at 1812 (e.g., players may be prevented from playing that game and/or from winning prizes based on game play). Otherwise, the appropriate modification is made at 1814 and the monitoring continues at 1802.

At 1806, financial results associated with the game are monitored. For example, the game provider may analyze the game results 1306 stored in the game play database 1300 and/or the total game result 1404 stored in the game database 1400 to determine if a game has an appropriate prize model (e.g., indicating that the game will be profitable for the game provider). An indication of whether the game is associated with an appropriate prize model 1408 may then be stored in the game database 1400.

If the financial results are not acceptable at 1808, it is determined if the game can be modified to improve the financial results at 1810. If such a modification cannot be made, the game is retired at 1812. Otherwise, the appropriate modification is made at 1814 and the monitoring continues at 1802.

EXAMPLES

The following will illustrate some examples of the present invention. These examples do not limit the scope of the invention, and those skilled in the art will understand that the present invention is applicable in many other situations.

Consider a game provider who designs a number of games of skill to be played via the Internet, interactive television networks, and other digital platforms. The games are designed so that the game experience will be fun and challenging and a player's skill will have a significant impact on an outcome of a game. The games are simple, "winnable," and feel familiar to the consumer (e.g., by being derived from sports, trivia, logic, and household parlor-based games).

The game provider arranges for a player to provide a payment of one dollar in exchange for playing a computer-based golf game in which a game result is determined after about three minutes of game play. The game provider may also offer games at different price levels (e.g., from fifty cents to five dollars per game). Note that the game provider may, or may not, use advertising revenue to supplement profits and/or prizes.

During game play, the game provider receives two player input parameters from a player's PC via the Internet. In particular, the game provider receives an indication of a speed and angle associated with a swing of a simulated golf club.

The game provider then calculates a trajectory for a simulated golf ball based on the two input parameters and two additional values that are not transmitted to the player's PC. In particular, the two additional values represent a wind speed and direction that alter the trajectory of the simulated golf ball. In this way, the effectiveness of an automated game playing device 260 is reduced (e.g., because the automated game playing device 260 will be unable to determine the wind speed and direction).

A game result is then determined. A successful game result may indicate, for example, that the simulated golf ball has come to rest within a predetermined distance of a simulated golf hole. A prize may then be awarded to the player based on the game result. By way of example, the game provider may implement a prize structure to make sure that players will (i) receive back between seventy percent and eighty percent of their payments over time, (ii) have a high win frequency (e.g., one out of three games played), and (iii) have at least some chance to win a million dollar prize. In this way, players will be attracted to the game (due to the possibility of a large prize) and frequently receive positive feedback during game play (due to the high win frequency).

As another example, the game provider designs a potential graphical puzzle game in which a player pieces together twelve square puzzle pieces to form a picture. The puzzle game is then evaluated to estimate the amount of player skill required to succeed in the game. In this example, the game provider determines that the puzzle game requires a sufficient amount of skill (e.g., a player must use reasoning when solving the puzzle). The puzzle game is also evaluated to determine an ability. of an automated game playing device 260 to play the game. In this example, the game provider determines that an automated game playing device 260 would be able to play the puzzle game successfully (e.g., by analyzing graphical information displayed on a game display to determine the correct sequence of puzzle pieces).

The challenge for the game provider is to successfully balance the tensions of regulatory acceptability, expert management, and consumer perception. In order to meet the legal and regulatory requirements, the outcome of the games must be "predominantly determined" by the player's input and use of skill. The games, however, cannot be susceptible to the problem of expert domination, or not enough players will pay to play. More significantly, the games cannot be susceptible to being hacked by automated computer routines. At the same time, the games have to be simple and fun, and the consumer has to believe that winning a prize as a result of every game play is achievable.

Because the potential puzzle game could be successfully played by an automated game playing device 260, the game provider modifies the design of the game by incorporating basic reasoning into game play. In particular, the game provider modifies the potential game such that each of the twelve square puzzle pieces contains a word instead of a portion of a picture. When correctly completed, the puzzle will for several simple and factually accurate statements (e.g., "The-Sky-Is-Blue"). In this way, it will be extremely difficult to create an automated game playing device 260 that can successfully play the game (e.g., because such a device would not know whether the correct solution should state that "the sky is blue" or that "the sky is red").

Note that this added element should not have a significant effect on game play by human players (e.g., it can be assumed that almost every human player will know that the sky is blue and not red) while substantially inhibiting the use of automated game playing devices 260. In other words, the modified game actually has two game goals (i. e., piecing together the twelve square puzzle pieces and forming a true statement). The first game goal (i.e., placing the pieces in the puzzle) may require a significant amount of player skill (i.e., the player may need to act quickly and/or the squares may be of different sizes), but this goal is also susceptible to an automated game playing device 250. The second game goal (i.e., forming true statements) does not require a significant amount of player skill and is less susceptible to an automated game playing device 260.

Additional Embodiments

The following illustrates various additional embodiments of the present invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although most of the embodiments described herein are associated with a game controller 1100 generating an additional value that is used to determine a game result, such a function may instead be performed by a player device 200. For example, a first player may use a first player device 200 to input a wind speed and direction that is used when determining a game result for a second player at a second player device 200.

Similarly, although embodiments of the present invention are described with respect to games of skill associated a single player, according to other embodiments the games of skill are instead associated with multiple players. For example, a set of players (e.g., members of a family or a "team" of players) may be play a game of skill as described herein.

In some of the embodiments described herein, a check may be mailed to a player based on an amount won during game play. However, payments can also be provided to the player in other ways. For example, a game provider may give a player a payment card that the player uses to collect winning amounts via, for example, an Automated Teller Machine (ATM) device.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method of developing a game of skill, comprising:

determining a potential game to be played at a remote player device via a communication network;

evaluating the potential game to estimate an amount of player skill required to play the potential game, said evaluating being performed based on a sample of player performance information;

evaluating the potential game to determine an ability of an automated game playing device to play the potential game; and modifying the potential game if (i) the amount of player skill required is unacceptable or (ii) the ability of the automated game playing device is unacceptable.

2. The method of claim 1, wherein the remote player device comprises at least one of: (i) a personal computer, (ii) a portable computing device, (iii) a personal digital assistant, (iv) a telephone, (v) a wireless telephone, (vi) a game terminal, (vii) an interactive television device, and (viii) a kiosk.

3. The method of claim 1, wherein the communication network comprises at least one of: (i) the Internet, (ii) a public network, (iii) a public switched telephone network, (iv) a proprietary network, (v) a cable television network, (vi) a wireless network, and (vii) a local area network.

4. The method of claim 1, further comprising:

receiving form a player a fee to play the game of skill, wherein the game of skill is based on the modified potential game;

receiving a player input parameter from the remote player device via the communication network;

determining a game result based on the player input parameter; and providing a prize to the player based on the game result.

5. The method of claim 4, wherein the fee is received from the player via a payment identifier.

6. The method of claim 5, wherein the payment identifier is associated with at least one of: (i) a credit card account, (ii) a debit card account, (iii) a bank account, and (iv) a digital payment protocol.

7. The method of claim 4, wherein the prize comprises payment of at least one of: (i) a monetary amount, and (ii) an alternate currency.

8. The method of claim 4, further comprising:

evaluating game results associated with a plurality of players; and determining that prizes will no longer be provided with respect to the game of skill.

9. The method of claim 1, wherein said modifying the potential game comprises requiring the player to utilize reasoning.

10. The method of claim 1, wherein said modifying the potential game comprises requiring the player to utilize an understanding of human behavior.

11. The method of claim 1, wherein said modifying the potential game comprises altering game information transmitted to the remote player device.

12. The method of claim 1, wherein said modifying the potential game comprises limiting an amount of information transmitted to the remote player device.

13. The method of claim 1, wherein at least one of said evaluations are performed by a game controller.

14. A game controller, comprising:

a processor; and a storage device in communication with said processor and storing instructions adapted to be executed by said processor to:

determine a potential game to be played at a remote player device via a communication network;

evaluate the potential game to estimate an amount of player skill required to play the potential game, said evaluating being performed based on a sample of player performance information;

evaluate the potential game to determine an ability of an automated game playing device to play the potential game; and arrange for the potential game to be modified if (i) the amount of player skill required is unacceptable or (ii) the ability of the automated game playing device is unacceptable.

15. The game controller of claim 14, wherein said storage device further stores at least one of: (i) a player database, (ii) a game play database, and (iii) a game database.

16. The game controller of claim 14, further comprising:

a communication device coupled to said processor and adapted to communicate with at least one of: (i) a player device, and (ii) a payment device.

17. A medium storing instructions adapted to be executed by a processor to perform a method of facilitating game development, said method comprising:

determining a potential game to be played at a remote player device via a communication network;

evaluating the potential game to estimate an amount of player skill required to play the potential game, said evaluating being performed based on a sample of player performance information;

evaluating the potential game to determine an ability of an automated game playing device to play the potential game; and arranging for the potential game to be modified if (i) the amount of player skill required is unacceptable or (ii) the ability of the automated game playing device is unacceptable.

* * * * *